(12) United States Patent
Flynn et al.

(10) Patent No.: US 7,971,437 B2
(45) Date of Patent: *Jul. 5, 2011

(54) THERMAL ENERGY STORAGE SYSTEMS AND METHODS

(75) Inventors: Brian J. Flynn, Churchville, NY (US); Gerald Geiken, Rochester, NY (US)

(73) Assignee: Bell Independent Power Corporation, Pittsford, NY (US)

( * ) Notice: Subject to any disclaimer, the term of this patent is extended or adjusted under 35 U.S.C. 154(b) by 464 days.

This patent is subject to a terminal disclaimer.

(21) Appl. No.: 12/172,673

(22) Filed: Jul. 14, 2008

(65) Prior Publication Data

US 2008/0276616 A1   Nov. 13, 2008

(51) Int. Cl.
  *F01K 1/00*   (2006.01)
  *B23P 17/04*   (2006.01)
(52) U.S. Cl. .......................... 60/659; 29/592
(58) Field of Classification Search .......... 60/645, 60/659; 165/10; 29/592
  See application file for complete search history.

(56) References Cited

U.S. PATENT DOCUMENTS

| | | | |
|---|---|---|---|
| 2,499,608 A * | 3/1950 | Rink | 165/142 |
| 2,578,059 A * | 12/1951 | Graham | 165/163 |
| 2,774,575 A | 3/1952 | Walter | |
| 2,933,885 A | 4/1960 | Benedek et al. | |
| 3,191,674 A * | 6/1965 | Richardson | 165/158 |
| 3,991,936 A | 11/1976 | Switzgable | |
| 4,117,882 A | 10/1978 | Shurcliff | |
| 4,124,018 A | 11/1978 | Murray et al. | |
| 4,131,158 A | 12/1978 | Abhat et al. | |
| 4,166,449 A | 9/1979 | Depew | |
| 4,171,617 A | 10/1979 | Sakamoto et al. | |
| 4,200,148 A | 4/1980 | Friefeld | |
| 4,205,656 A | 6/1980 | Scarlata | |
| 4,403,645 A | 9/1983 | MacCracken | |
| 4,410,031 A | 10/1983 | Lindner et al. | |
| 4,491,172 A | 1/1985 | Hitchin | |
| 4,508,101 A | 4/1985 | Carter et al. | |
| 4,609,036 A | 9/1986 | Schrader | |
| 4,727,930 A | 3/1988 | Bruckner et al. | |
| 4,797,160 A | 1/1989 | Salyer | |
| 4,993,481 A | 2/1991 | Kamimoto et al. | |

(Continued)

FOREIGN PATENT DOCUMENTS

DE   2917648 A1   12/1980

(Continued)

OTHER PUBLICATIONS

International Search Report and Written Opinion of PCT/US2009/050419, which claims priority to this application.

(Continued)

*Primary Examiner* — Hoang M Nguyen
(74) *Attorney, Agent, or Firm* — John M. Hammond; Patent Innovations LLC

(57) ABSTRACT

A thermal energy storage apparatus is disclosed. The thermal energy storage apparatus has a phase change medium. The thermal energy storage apparatus also has an inner manifold area having at least one inner feed port. The thermal energy storage apparatus also has an outer manifold area having at least one outer feed port and fluidically coupled to the inner manifold area. The inner manifold area and the outer manifold area are configured to be substantially immersed in the phase change medium. Methods of constructing and controlling embodiments of related thermal energy storage apparati are also disclosed, as well as embodiments of related heat exchangers.

70 Claims, 19 Drawing Sheets

U.S. PATENT DOCUMENTS

| | | |
|---|---|---|
| 5,944,089 A | 8/1999 | Roland |
| 6,101,821 A | 8/2000 | Cates |
| 6,247,522 B1 | 6/2001 | Kaplan et al. |
| 6,371,198 B1 | 4/2002 | Hirano |
| 6,772,823 B2 | 8/2004 | Hirano |
| 6,955,050 B2 | 10/2005 | Perkins et al. |
| 2005/0247430 A1 | 11/2005 | Gast |
| 2007/0074717 A1 | 4/2007 | Law et al. |
| 2007/0101717 A1 | 5/2007 | Beaulieu |
| 2008/0092875 A1 | 4/2008 | Leifer et al. |
| 2008/0289793 A1 | 11/2008 | Geiken et al. |

FOREIGN PATENT DOCUMENTS

| | | |
|---|---|---|
| DE | 4006965 A1 | 12/1991 |
| EP | 0999424 A2 | 10/2000 |
| EP | 1577548 A1 | 9/2005 |
| JP | 60256797 A1 | 12/1985 |
| WO | 98/40684 A1 | 9/1998 |

OTHER PUBLICATIONS

International Search Report of PCT/US2008/064464, which claims priority to commonly owned U.S. Appl. No. 12/033,604.

* cited by examiner

THERMAL ENERGY STORAGE SYSTEMS AND METHODS

FIELD

The claimed invention generally relates to energy storage and, more particularly, to thermal energy storage systems and methods thereof.

BACKGROUND

Worldwide, there are ever-growing demands for electricity due to increasing populations, technology advancements requiring the use of electricity, and the proliferation of such technology to more and more countries around the world. At the same time, there is an increasing push to harness reusable sources of energy to help meet these increasing electricity demands and offset and/or replace traditional carbon-based generators which continue to deplete natural resources around the world.

Many solutions have been developed to collect and take advantage of reusable sources of energy, such as solar cells, solar mirror arrays, and wind turbines. Solar cells produce direct current energy from sunlight using semiconductor technology. Solar mirror arrays focus sunlight on a receiver pipe containing a heat transfer fluid which absorbs the sun's radiant heat energy. This heated transfer fluid is then pumped to a turbine which heats water to produce steam, thereby driving the turbine and generating electricity. Wind turbines use one or more airfoils to transfer wind energy into rotational energy which spins a rotor coupled to an electric generator, thereby producing electricity when the wind is blowing. All three solutions produce electricity when their associated reusable power source (sun or wind) is available, and many communities have benefited from these clean and reusable forms of power.

Unfortunately, when the sun or wind is not available, such solutions are not producing any power. In the case of solar solutions, non-reusable energy solutions are often turned-to overnight. Similar issues arise for wind turbines during calm weather. Therefore, some form of energy storage is needed to store excess energy from the reusable power sources during power generation times to support energy demands when the reusable power source is unavailable or unable to meet peak demands for energy.

Solar mirror arrays generate and transfer heat as an inherent part of their operation. Solar cells and wind turbines which typically generate electricity can also selectively be used to drive heaters to generate heat and/or transfer heat from windings to a heat transfer fluid. Several solutions have been developed to store heat from these renewable energy sources for use in non-energy-generating times.

FIG. 1 illustrates a two-tank direct energy storage system. Heat transfer fluid is heated by mirrors in a solar field 30 and stored in a hot oil tank 32. The heat transfer fluid is then pumped through a steam generator 34 as needed to generate steam and power a turbine 36 to meet energy demands. Even if the solar field 30 is not producing newly heated heat transfer fluid for the hot oil tank 32, the hot oil tank 32 has a certain capacity to provide stored hot transfer fluid to the steam generator 34 for power generation. After passing though the steam generator 34, the cooled heat transfer fluid is then pumped into and stored in a cold oil tank 38. When the solar field 30 is active, cooled heat transfer fluid is pumped from the cold oil tank 38, through the solar field to be heated-up, and back to the hot oil tank 32 where the process can begin again. While the two-tank direct energy storage system of FIG. 1 helps to store energy for non-generation times, it is unfortunately complex, requires two expensive tanks, and is limited in the amount energy it can store due to limitations in the heat storage capacity of the heat transfer fluid.

FIG. 2 illustrates a two-tank indirect energy storage system. Relatively cold molten salt is pumped from a cold salt tank 40 out to a heat exchanger 42 where it is heated by proximity to counter-current running hot heat transfer fluid from the solar field 44. The newly-heated molten salt is then pumped from the heat exchanger 42 into a hot salt tank 46 where it is stored until needed. When energy needs to be reclaimed from the hot salt tank 46, the hot molten salt is pumped out of the hot salt tank 46 and to a turbine system 48 whereby the heat from the hot molten salt is used to generate steam to drive the turbine system 48. Relatively cold molten salt exits the turbine system 48 and is pumped back into the cold salt tank 40. Alternatively, the hot molten salt from the hot salt tank 46 may be pumped out of the hot salt tank 46 and back through the heat exchanger 42 to heat the heat transfer fluid from the solar field 44 before being pumped back into the cold salt tank 40. In this alternate setup, the reheated heat transfer fluid would then be pumped through the turbine system before being recirculated to the solar field. Taking advantage of the heat storage capacities of salt in this indirect two-tank system, more energy may be stored than in the direct system. Unfortunately, this system still requires two expensive tanks. Furthermore, the system of FIG. 2 will be subjected-to complexities and issues arising from the need to pump and transport molten salt. The system may have the need to keep the salt molten at all times and therefore may require the addition of heaters not powered by the solar field. If the salt is allowed to solidify within the transport pipes, the natural expansion of the salt when transitioning from the solid state back to the liquid state may cause stress cracks in the pipes. Furthermore, if the salt is allowed to solidify, the system may take an undesirable amount of time to come on-line as it waits for the salt to liquefy to become pumpable. Corrosion is also an issue when pumping molten salt.

FIG. 3 illustrates a single-tank thermocline energy storage system. The thermocline tank 50 holds a hot molten salt on the top of the tank 50 and a relatively cool molten salt in the bottom of the tank 50. When the solar field 52 is active, a hot heat transfer fluid is pumped from the solar field to a heat exchanger 54. The relatively cool molten salt is pumped out of the bottom of the thermocline tank 50 out to the heat exchanger 54 where it is heated by proximity to the hot heat transfer fluid from the solar field. The heated molten salt is then returned to the top of the thermocline tank 50. When the solar field 52 is not active, the flow to and from the thermocline tank 50 is reversed. Heated molten salt is pumped out of the top of the thermocline tank 50 to the heat exchanger 54, where it transfers its heat to the heat transfer fluid. The heat transfer fluid is pumped to a turbine system 56 for generating electricity. The molten salt which gave up some of its heat in the heat exchanger 54 is then returned to the bottom of the thermocline tank 50. While this system takes advantage of a vertical temperature gradient within the thermocline tank to move down to a single tank, the tank itself may still be expensive when properly sized for industrial and/or community demands, and the system continues to have the corrosion and solidification concerns mentioned above when pumping molten salt.

Therefore, there is a need for a thermal energy storage system which can take advantage of the high energy storage capacities of phase change media, such as salts, while avoiding corrosion and solidification issues in an inexpensive, scalable, easy-to-construct, control, and maintain fashion.

SUMMARY

A thermal energy storage apparatus is disclosed. The thermal energy storage apparatus has a phase change medium. The thermal energy storage apparatus also has an inner manifold area having at least one inner feed port. The thermal energy storage apparatus also has an outer manifold area having at least one outer feed port and fluidically coupled to the inner manifold area. The inner manifold area and the outer manifold area are configured to be substantially immersed in the phase change medium.

A thermal energy power system is also disclosed. The thermal energy power system has a) a phase change medium; b) an inner manifold area; c) an outer manifold area; d) an intermediate manifold area; e) a first plurality of U-tubes coupled between the outer manifold area and the intermediate manifold area; f) a second plurality of U-tubes coupled between the intermediate manifold area and the inner manifold area, wherein the inner manifold area is fluidically coupled to the outer manifold area via the second plurality of U-tubes, the intermediate manifold area, and the second plurality of U-tubes; g) a brick structure configured to contain the phase change medium such that the inner manifold area, the intermediate manifold area, and the outer manifold area are substantially immersed in the phase change medium and wherein the bricks are configured to have a cooling zone which encourages the phase change medium to solidify in gaps defined by the bricks; h) a base which supports the brick structure; i) a pump; j) a renewable heat source; k) a turbine plant; and l) wherein the inner manifold area and the outer manifold area are reversibly connected in a closed loop with the pump, the renewable heat source, and the turbine plant and wherein the closed loop carries a heat transfer fluid.

A method of constructing a thermal energy storage system is also disclosed. A base is formed. At least one heat exchange system is aligned substantially over the base, the at least one heat exchange system comprising a substantially concentric manifold having an outer manifold area and an inner manifold area. A brick wall is dry-laid substantially on the base to surround the at least one heat exchange system or an area where the at least one heat exchange system will be aligned. The area defined by the base and the brick wall is filled with a phase change medium such that the phase change medium substantially covers the at least one heat exchange system.

A further method of constructing a thermal energy storage system is disclosed. A base is formed. At least one heat exchange system is aligned substantially over the base, the at least one heat exchange system comprising a substantially concentric manifold having an outer manifold area and an inner manifold area. A brick wall is dry-laid substantially on the base to surround the at least one heat exchange system or an area where the at least one heat exchange system will be aligned. At least one liner layer is formed inside the area occupied by the brick wall or inside the area the brick wall will occupy. The area defined by the base and the at least one liner layer is filled with a phase change medium such that the phase change medium substantially covers the at least one heat exchange system.

A method of controlling a thermal energy storage system is also disclosed. When a renewable heat source is available: i) the renewable heat source is thermally and fluidically coupled to an inner manifold area of a heat exchange system which is substantially immersed in a phase change medium and which is further coupled to an outer manifold area of the heat exchange system which is also substantially immersed in the phase change medium; and ii) the outer manifold area is thermally and fluidically coupled to a turbine plant and then back to the renewable heat source in a closed-loop heating mode which provides a remaining renewable energy source heat to the turbine plant. When the renewable heat source is not available: i) the renewable heat source is thermally and fluidically coupled to the outer manifold area; and ii) the inner manifold area is thermally and fluidically coupled to the turbine plant and then back to the renewable heat source in a closed-loop cooling mode which provides a stored heat to the turbine plant.

A heat exchanger for a thermal energy storage system is also disclosed. The heat exchanger has an inner manifold area having at least one inner feedport. The heat exchanger also has an outer manifold area having at least one outer feedport and fluidically coupled to the inner manifold area. The inner and outer manifold areas are configured to enable a heat transfer fluid to reversibly flow from the inner manifold area to the outer manifold area when the inner manifold area and the outer manifold area are substantially immersed in a phase change medium.

A thermal energy storage apparatus is also disclosed. The thermal energy storage apparatus has a phase change medium and a plurality of heat exchangers substantially immersed in the phase change medium.

Figure 1:
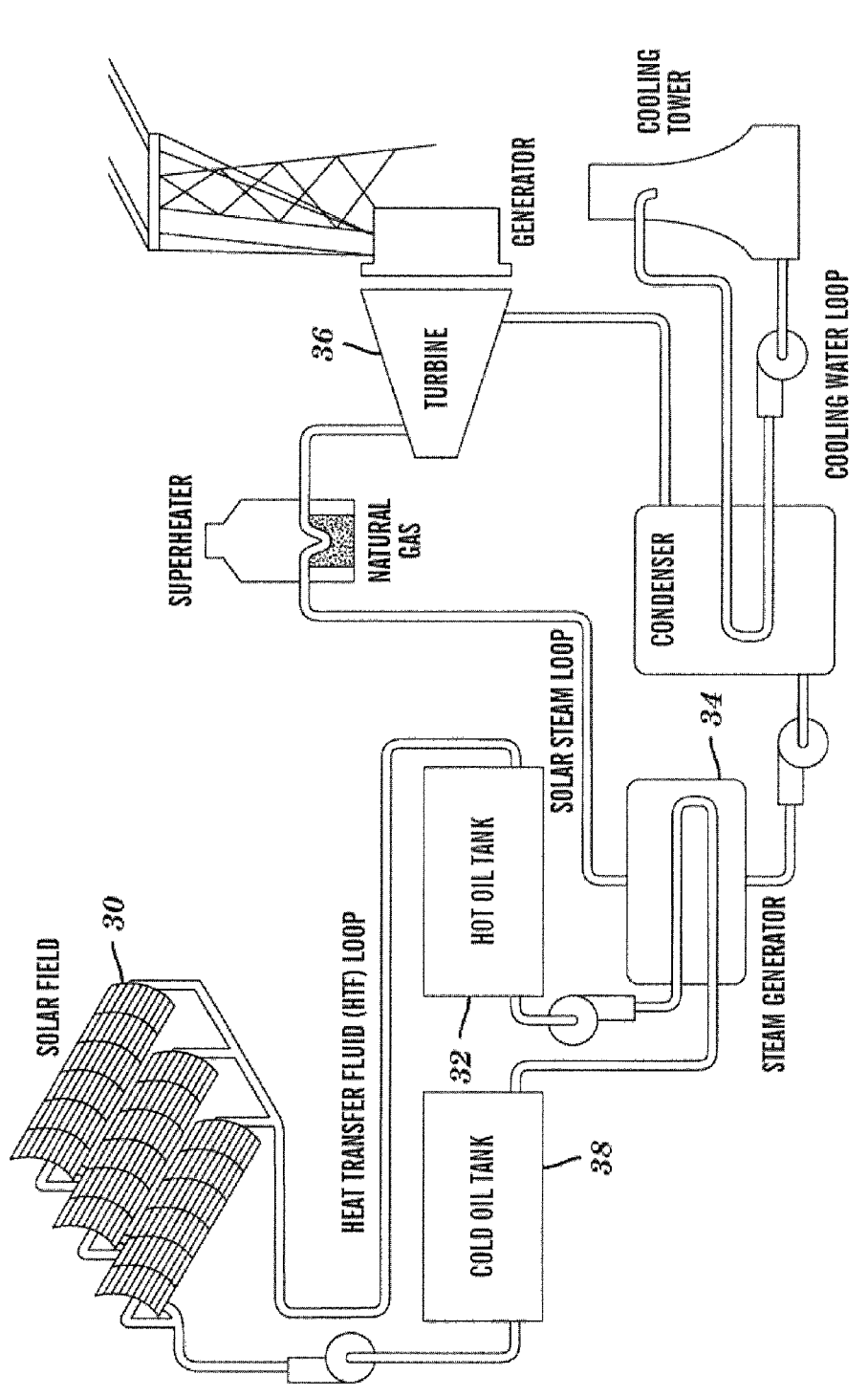
FIG. 1 illustrates a prior art embodiment of a direct two-tank thermal energy storage system.
Figure 2:
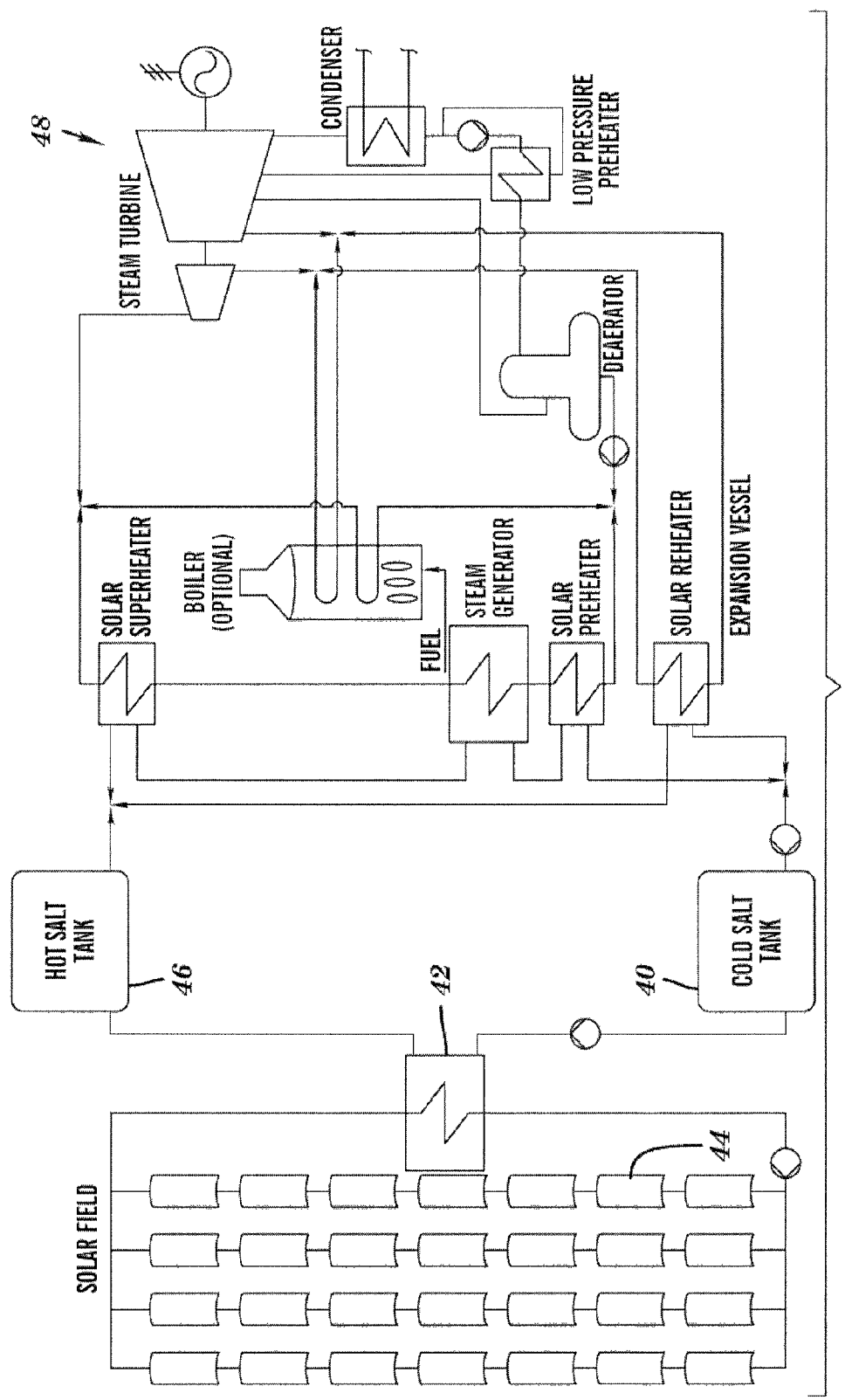
FIG. 2 illustrates a prior art embodiment of an indirect two-tank thermal energy storage system.
Figure 3:
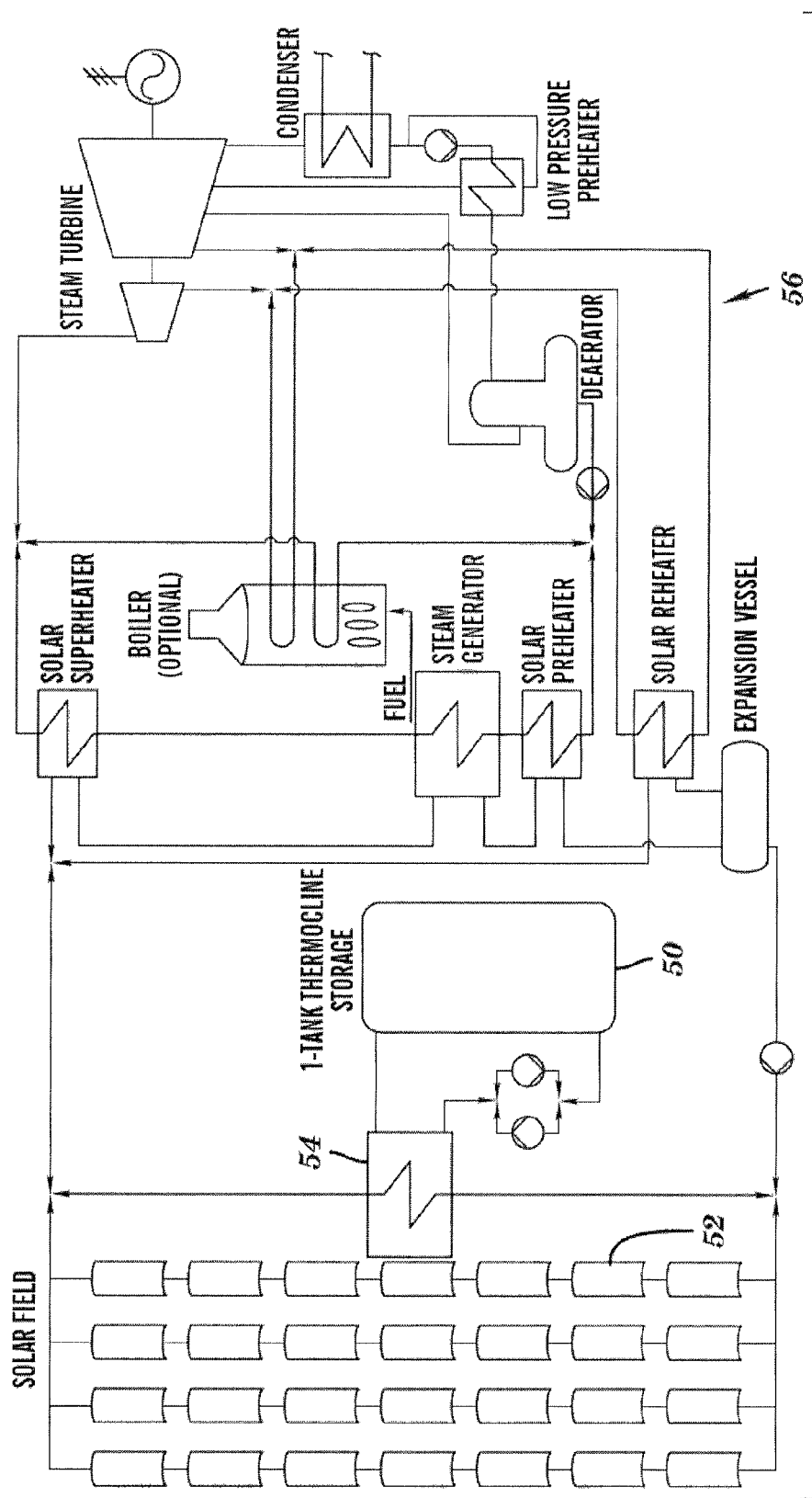
FIG. 3 illustrates a prior art embodiment of a single tank thermocline energy storage system.

It will be appreciated that for purposes of clarity and where deemed appropriate, reference numerals have been repeated in the figures to indicate corresponding features, and that the various elements in the drawings have not necessarily been drawn to scale in order to better show the features.

DETAILED DESCRIPTION

Figure 4A:
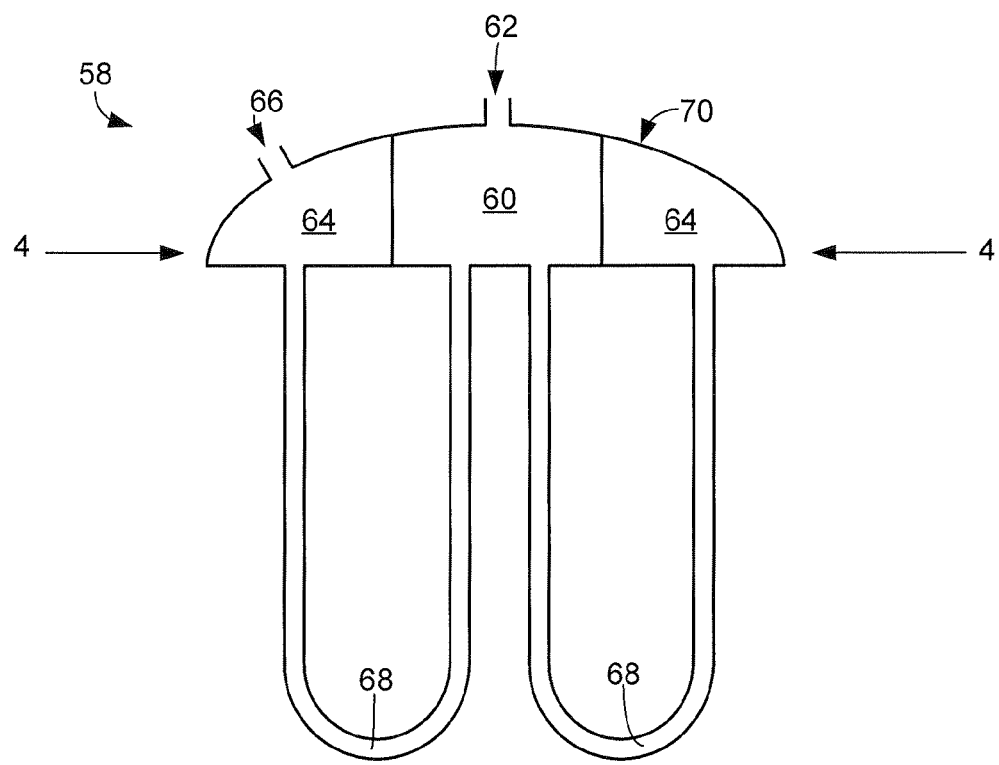
FIG. 4A schematically illustrates a side cross-sectional view of one embodiment of a heat exchanger for use in an energy storage system.

FIG. 4A schematically illustrates a side cross-sectional view of one embodiment of a heat exchanger 58 for use in an energy storage system. The heat exchanger 58 has an inner manifold area 60 with an inner feedport 62. The heat exchanger 58 also has an outer manifold area 64 with an outer feedport 66. The inner feedport 62 and the outer feedport 66 do not have to project out from the inner and outer manifold areas 60, 64. The inner and outer feedports 62, 66 may optionally be openings which provide access for fluid delivery via external piping which can be attached to inner and outer feedports 62, 66. Such external piping may enter vertically, horizontally, or at any desired angle. The outer manifold area 64 is fluidically coupled to the inner manifold area 60, in this embodiment via a plurality of U-tubes 68. For simplicity this embodiment only illustrates two U-tubes 68, however other embodiments may have differing numbers of U-tubes. The U-tubes 68 may be welded to holes in the manifold areas. In this embodiment, the U-tubes 68 have a circular cross-sectional shape. In other embodiments, the U-tubes may have other cross-sectional shapes, such as, but not limited to oval, square, triangular, and hexagonal. The inner manifold area 60 and the outer manifold area 64 are preferably substantially concentric, however in other embodiments, the inner and outer manifold areas may not be substantially concentric.

In this embodiment, the inner manifold area 60 and the outer manifold area 64 lie in substantially the same plane. In other embodiments, the inner manifold area 60 may be on a lower plane than the outer manifold area 64 or visa versa.

The substantially concentric manifold 70 comprising the inner manifold area 60 and the outer manifold area 64 may be constructed of a variety of materials, for example, but not limited to plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

The inner feedport 62 is configured to allow a heat transfer fluid to flow into the inner manifold area 60, down and backup through U-tubes 68, into the outer manifold area 64, and back out the outer feedport 66. This flow path through the heat exchanger 58 may also be reversed. Suitable examples of a heat transfer fluid include, but are not limited to mineral oil and other types of oil. The heat exchanger 58 is designed to be substantially immersed in a phase change medium (not shown in this view) and should preferably be manufactured from a material which is compatible with the phase change medium.

Suitable examples of materials which the heat exchanger 58 may be manufactured from include, but are not limited to plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

Figure 4B:
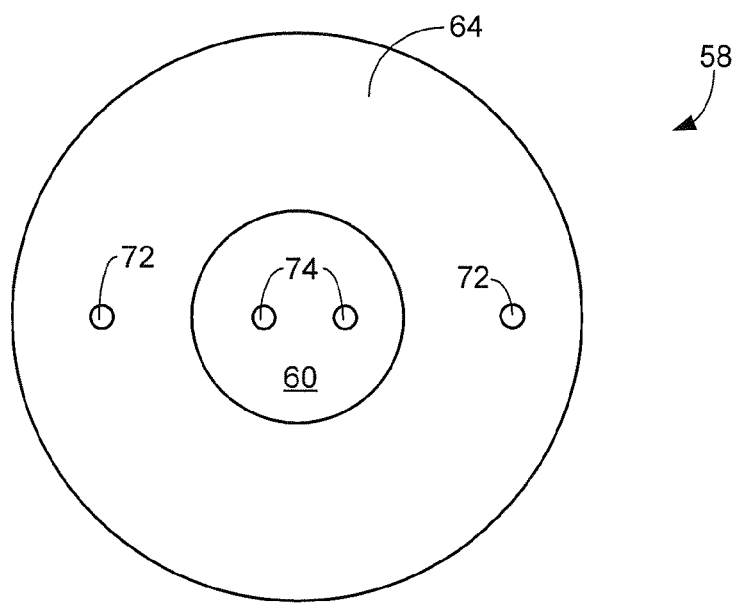
FIG. 4B schematically illustrates a top cross-sectional view of the embodied heat exchanger of FIG. 4A.

FIG. 4B schematically illustrates a top cross-sectional view of the embodied heat exchanger 58 of FIG. 4A taken along lines 4-4. In this embodiment, the outer manifold area 64 has a ring shape when viewed from the top. In other embodiments, the shape of the outer manifold area 64 when viewed from the top may include, but is not limited to an oval, a square, a rectangle, a triangle, a hexagon, and combinations thereof. This top-view shape may be chosen to fit within a design-constrained space or may be chosen to mirror the shape of a structure which will house the heat exchanger 58. In this embodiment, the inner manifold area 60 is substantially concentric with the outer manifold area 64, and has a circle shape when viewed from the top. In other embodiments, the shape of the inner manifold area when viewed from the top may include, but is not limited to an oval, a square, a rectangle, a loop, a triangle, and a hexagon. In a heat exchanger such as the one embodied in FIG. 4B, U-tubes are connecting the outer manifold area 64 with the inner manifold area 60. Therefore, the outer manifold area 64 will have outer manifold access points 72 and the inner manifold area 60 will have inner manifold access points 74. Each U-tube will be connected to an outer manifold access point 72 on one end and to an inner manifold access point 74 on the other end. A heat exchanger having only an inner manifold area and an outer manifold area will be a two-pass system, whereby fluid can move from the inner manifold area 60 down through each U-tube for a first pass, and back up through each U-tube for a second pass to the outer manifold area 64 or visa versa.

Figure 5A:
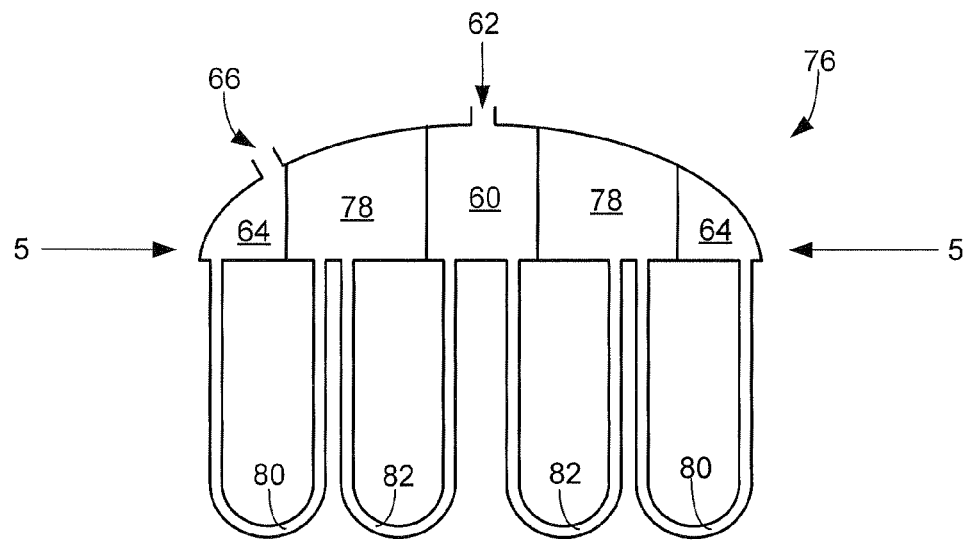
FIG. 5A schematically illustrates a side cross-sectional view of another embodiment of a heat exchanger for use in an energy storage system.

Heat exchangers with more than two passes may also be constructed by adding one or more intermediate manifold areas. For example, FIG. 5A schematically illustrates a side cross-sectional view of one embodiment of a heat exchanger 76 for use in an energy storage system. The heat exchanger 76 has an inner manifold area 60 with an inner feedport 62. The heat exchanger 76 also has an outer manifold area 64 with an outer feedport 66. The inner feedport 62 and the outer feedport 66 do not have to project out from the inner and outer manifold areas 60, 64. The inner and outer feedports 62, 66 may optionally be openings which provide access for fluid delivery via external piping which can be attached to inner and outer feedports 62, 66. Such external piping may enter vertically, horizontally, or at any desired angle. The heat exchanger 76 also has an intermediate manifold area 78. The outer manifold area 64 is fluidically coupled to the intermediate manifold area 78, in this embodiment via a first plurality of U-tubes 80. For simplicity this embodiment only illustrates two U-tubes 80, however other embodiments may have differing numbers of U-tubes 80. The intermediate manifold area 78 is fluidically coupled to the inner manifold area 60, in this embodiment via a second plurality of U-tubes 82. For simplicity this embodiment only illustrates two U-tubes 82, however other embodiments may have differing numbers of U-tubes 82. The U-tubes 80, 82 may be welded to holes in the manifold areas. In this embodiment, the U-tubes 80, 82 have a circular cross-sectional shape. In other embodiments, the U-tubes may have other cross-sectional shapes, such as, but not limited to oval, square, triangular, and hexagonal. The inner manifold area 60, the intermediate manifold area 78, and the outer manifold area 64 are preferably substantially concentric, however in other embodiments, the inner, intermediate, and outer manifold areas may not be substantially concentric.

In this embodiment, the inner manifold area 60, the intermediate manifold area 78, and the outer manifold area 64 lie in substantially the same plane. In other embodiments, one or more of the manifold areas 60, 64, 78 may lie in a different planes.

The substantially concentric manifold 84 comprising the inner manifold area 60, the at least one intermediate manifold area 78, and the outer manifold area 64 may be constructed of a variety of materials, for example, but not limited to plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

In the embodiment of FIG. 5A, the inner feedport 62 is configured to allow a heat transfer fluid to flow into the inner manifold area 60, down and back-up through U-tubes 82, into the intermediate manifold area 78, down and back up through U-tubes 80, into the outer manifold area 64 and back out the outer feedport 66. This flow path through the heat exchanger 76 may also be reversed. Suitable examples of a heat transfer fluid include, but are not limited to mineral oil and other types of oil. The heat exchanger 76 is designed to be substantially immersed in a phase change medium (not shown in this view) and should preferably be manufactured from a material which is compatible with the phase change medium. The heat exchanger 76 of is a 4-pass system, but additional pass systems may be constructed by adding additional intermediate manifold areas. The substantially concentric arrangement of the different manifold areas enables a substantially concentric distribution of heat relative to the heat exchanger.

Suitable examples of materials which the heat exchanger 76 may be manufactured from include, but are not limited to plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenumniobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

Figure 5B:
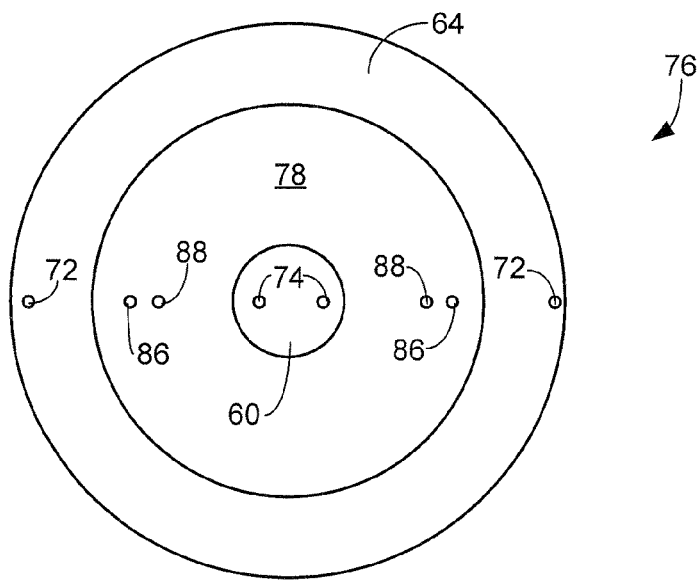
FIG. 5B schematically illustrates a top cross-sectional view of the embodied heat exchanger of FIG. 5A.

FIG. 5B schematically illustrates a top cross-sectional view of the embodied heat exchanger 76 of FIG. 5A taken along lines 5-5. In this embodiment, the outer manifold area 64 and the intermediate manifold area 78 have a ring shape when viewed from the top. In other embodiments, the shape of the intermediate manifold area 78 and the outer manifold area 64 when viewed from the top may include, but is not limited to an oval, a square, a rectangle, a triangle, a hexagon, and combinations thereof. This top-view shape may be chosen to fit within a design-constrained space or may be chosen to mirror the shape of a structure which will house the heat exchanger 76. In this embodiment, the inner manifold area 60 is substantially concentric with the outer manifold area 64, and has a circle shape when viewed from the top. In other embodiments, the shape of the inner manifold area when viewed from the top may include, but is not limited to an oval, a square, a rectangle, a loop, a triangle, and a hexagon. In a heat exchanger such as the one embodied in FIG. 5B, a first set of U-tubes are connecting the outer manifold area 64 with the intermediate manifold area 78. Therefore, the outer manifold area 64 will have outer manifold access points 72 and the intermediate manifold area 78 will have first intermediate manifold access points 86. Each of the first U-tubes will be connected to an outer manifold access point 72 on one end and to a first intermediate manifold access point 86 on the other end. A second set of U-tubes are connecting the intermediate manifold area 78 with the inner manifold area 60. Therefore, the intermediate manifold area 78 will have second intermediate manifold access points 88 and the inner manifold area 60 will have inner manifold access points 74.

Figure 6:
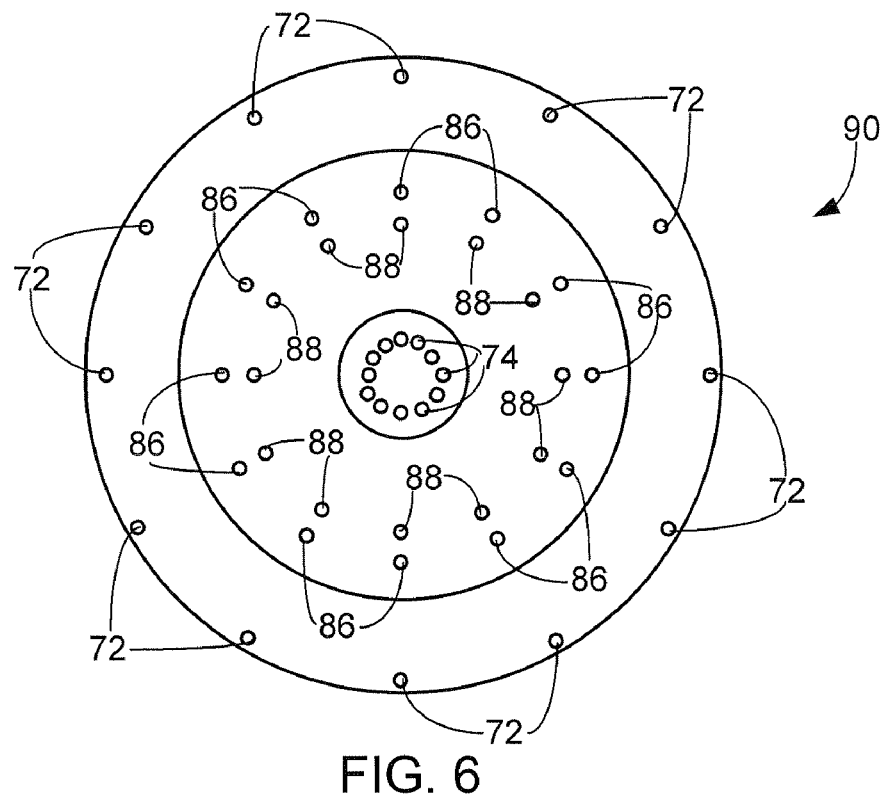
FIG. 6 schematically illustrates a top cross-sectional view of another embodiment of a heat exchanger for use in an energy storage system.

FIG. 6 schematically illustrates a top cross-sectional view of another embodiment of a heat exchanger 90. As mentioned, for simplicity, the previous four-pass embodiment of a heat exchanger only was shown with a small number of U-tubes, and therefore, with a relatively small number of outer manifold access points 72, first and second intermediate manifold access points 86, 88, and inner manifold access points 74. The heat exchanger embodied in FIG. 6 illustrates a greater number of the access points 72, 86, 88, and 74 in a four pass system. It should be apparent that even more U-tubes and corresponding access points could be built-in to a heat exchanger according to this disclosure in order to increase the heat exchange surface area, depending on the thermal transfer needs of the thermal energy storage system the heat exchanger would be used-in.

Figure 7:
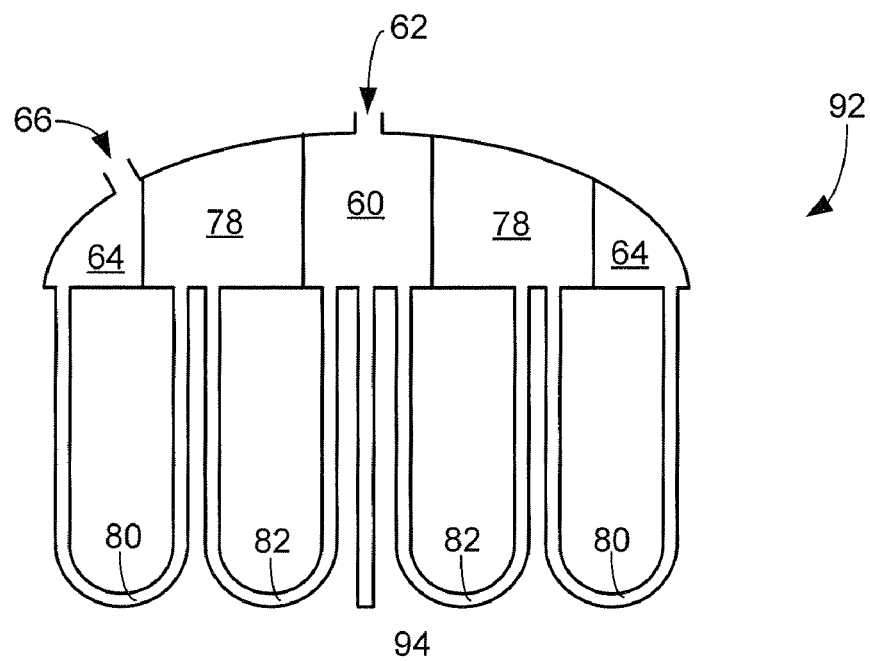
FIG. 7 schematically illustrates a side cross-sectional view of another embodiment of a heat exchanger for use in an energy storage system.

FIG. 7 schematically illustrates a side cross-sectional view of another embodiment of a heat exchanger 92 for use in an energy storage system. Similar to the embodiment of FIG. 5A, the embodiment of FIG. 7 has an inner manifold area 60 having an inner feedport 62, an intermediate manifold area 78, and an outer manifold area 64 having an outer feedport 66, the features of which have been discussed above. The outer manifold area 64 is fluidically coupled to the intermediate manifold area 78, in this embodiment via a first set of U-tubes 80. The intermediate manifold area 78 is fluidically coupled to the inner manifold area 60 by a second set of U-tubes 82. Other embodiments may have differing numbers of first U-tubes and/or second U-tubes.

As with all of the embodiments of the heat exchangers, this heat exchanger 92 is also designed to be substantially immersed in a phase change medium (not shown in this view). Unlike other thermal energy storage systems which use phase change medium, the current embodiments and their equivalents do not have to maintain the phase change medium in a liquid state because the phase change media is not being pumped anywhere. Instead, the heat exchangers are designed to be immersed in the phase change medium. This offers several benefits, including a simpler, less expensive design and the ability to take advantage of the latent heat of fusion which may still be present in a given phase change medium after it has solidified, thereby increasing the energy storage capacity of thermal energy systems using this design over prior art systems.

One of the considerations when operating a heat exchanger submersed in a phase change medium is how the heat exchanger will initially liquefy the phase change medium. Surprisingly, it has been discovered that if the phase change medium is heated too slowly, there can be too much expansion of the phase change medium because of an insufficient vent path through the phase change medium. This can put undesired stress on a container holding the phase change medium and even cause phase change medium to leak from the container. In order to assist the phase change medium to heat quickly, some embodiments of heat exchangers, such as the heat exchanger 92 in FIG. 7, may have one or more core heat tubes 94 which are directly or indirectly coupled to the inner manifold area 60. Such core heat tubes 94 may trap hot incoming heat transfer fluid supplied to the inner manifold area 60 and create a hot spot within the phase change medium that the exchanger will be placed within. The one or more core heat tubes 94 may be preferably placed near or in the central portion of the heat exchanger to quickly heat the middle of the phase change medium and create a vent path which helps to alleviate outward expansion of the phase change medium.

Figure 8:
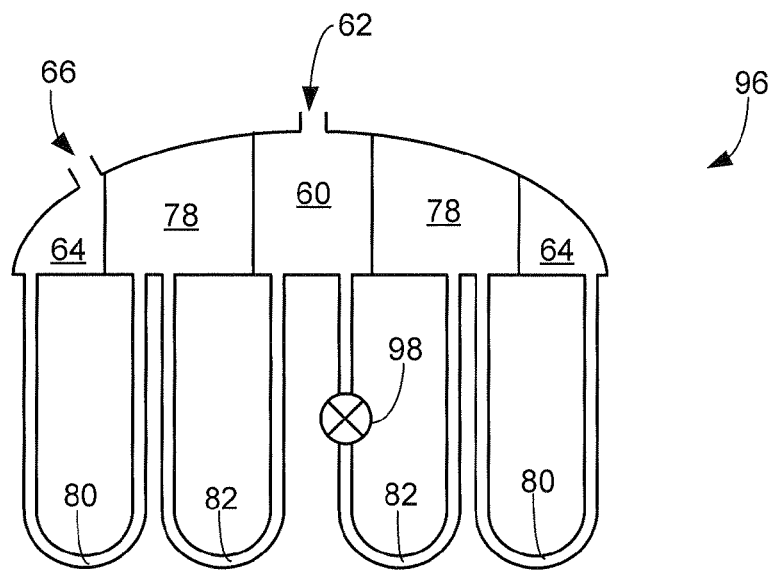
FIG. 8 schematically illustrates a side cross-sectional view of a further embodiment of a heat exchanger for use in an energy storage system.

FIG. 8 schematically illustrates a side cross-sectional view of a further embodiment of a heat exchanger 96 for use in an energy storage system. Similar to the embodiment of FIG. 5A, the embodiment of FIG. 8 has an inner manifold area 60 having an inner feedport 62, an intermediate manifold area 78, and an outer manifold area 64 having an outer feedport 66, the features of which have been discussed above. The outer manifold area 64 is fluidically coupled to the intermediate manifold area 78, in this embodiment via a first set of U-tubes 80. The intermediate manifold area 78 is fluidically coupled to the inner manifold area 60 by a second set of U-tubes 82. Other embodiments may have differing numbers of first U-tubes and/or second U-tubes. In this embodiment, at least one of the U-tubes coupled to the inner manifold area 60 has a bypass valve 98 which may be opened or closed by a mechanical, electromechanical, hydraulic, or pneumatic activator. In normal operation, if the bypass valve 98 is opened, U-tube having the valve operates like other U-tubes which do not have a bypass valve, allowing hot heat transfer fluid to flow through. If it is desired to create a hot spot around the U-tubes coupled to the inner manifold area, however, the bypass valve 98 may be fully or partially closed. As discussed above, the creation of a hot spot can assist the formation of a vent path to alleviate unwanted outward expansion.

Figure 9:
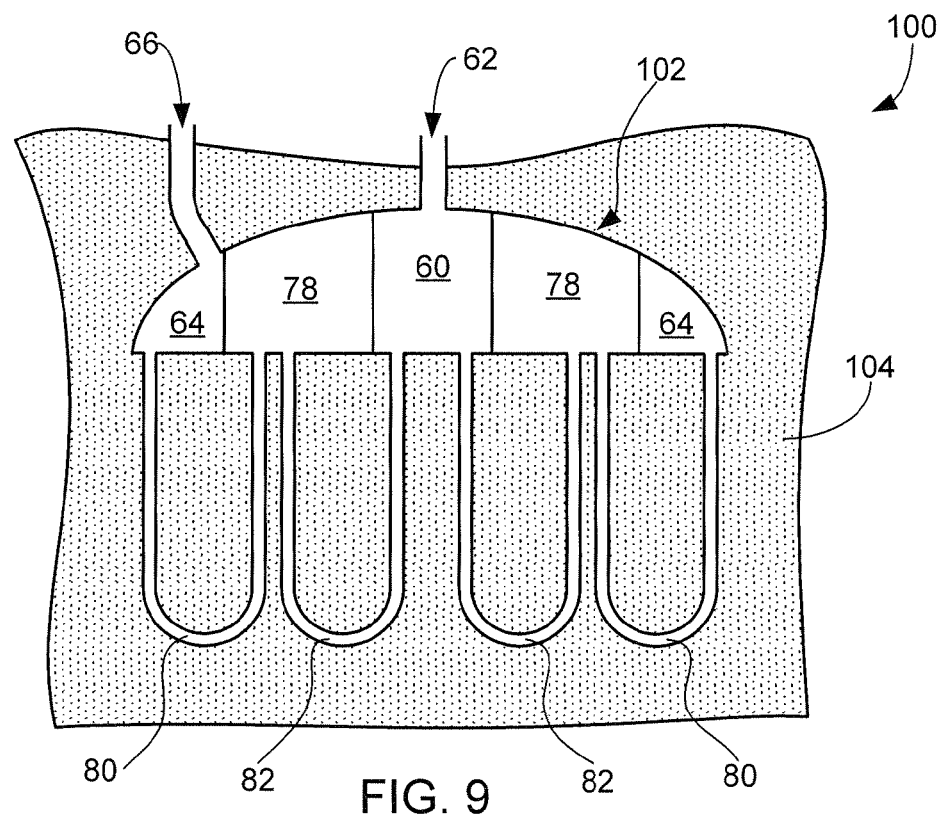
FIG. 9 schematically illustrates one embodiment of a thermal energy storage apparatus.

FIG. 9 schematically illustrates one embodiment of a thermal energy storage apparatus 100. The thermal energy storage apparatus 100 has a heat exchanger 102 such as the heat exchangers which have been discussed above. The illustrated heat exchanger 102 has an inner manifold area 60 having an inner feedport 62, an intermediate manifold area 78, and an outer manifold area 64 having an outer feedport 66, the features of which have been discussed above. The outer manifold area 64 is fluidically coupled to the intermediate manifold area 78, in this embodiment via a first set of U-tubes 80. The intermediate manifold area 78 is fluidically coupled to the inner manifold area 60 by a second set of U-tubes 82. Other embodiments may have differing numbers of first U-tubes and/or second U-tubes and may also include one or more core heat tubes and/or one or more U-tubes with a bypass valve as previously discussed. The manifold areas 60, 78, 64 are substantially immersed in a phase change medium 104.

The phase change medium 104 may be selected based on operating temperature considerations. Other considerations for the selection of the phase change medium 104 are chemical stability, non-toxicity, corrosiveness, and thermal properties, such as heat of fusion, thermal conductivity, and heat capacity. Suitable examples of phase change medium 104 may include, but are not limited to salt, a salt mixture, a eutectic salt mixture, lithium nitrate, potassium nitrate, sodium nitrate, sodium nitrite, calcium nitrate, lithium carbonate, potassium carbonate, sodium carbonate, rubidium carbonate, magnesium carbonate, lithium hydroxide, lithium fluoride, beryllium fluoride, potassium fluoride, sodium fluoride, calcium sulfate, barium sulfate, lithium sulfate, lithium chloride, potassium chloride, sodium chloride, iron chloride, tin chloride, zinc chloride, and any combination thereof.

Figure 10A:
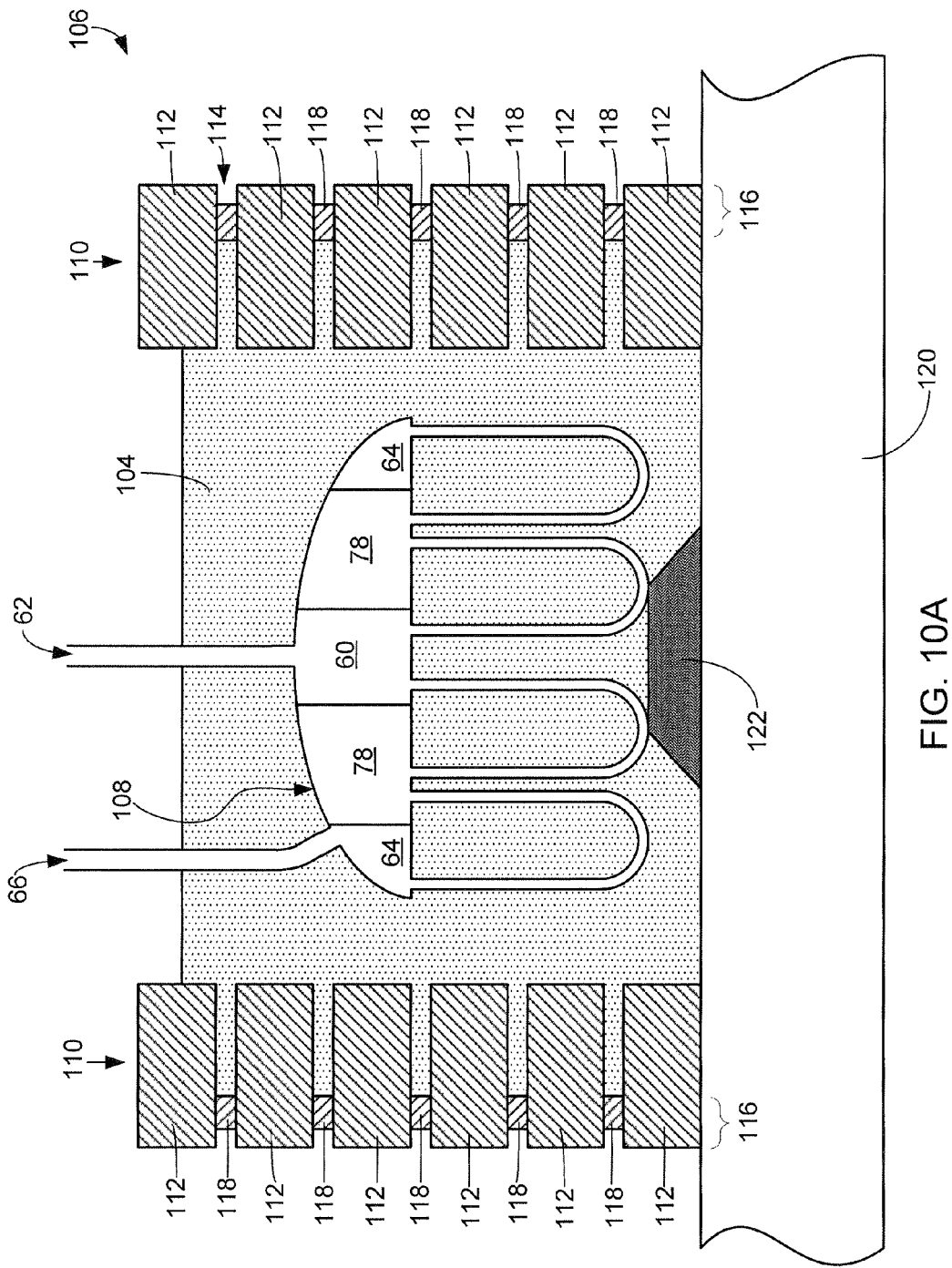
FIG. 10A schematically illustrates another embodiment of a thermal energy storage apparatus.

FIG. 10A schematically illustrates a side cross-sectional view of another embodiment of a thermal energy storage apparatus 106. The thermal energy storage apparatus 106 has a heat exchanger 108 similar to the heat exchangers which have been discussed above. The illustrated heat exchanger 108 has an inner manifold area 60 having an inner feedport 62, an intermediate manifold area 78, and an outer manifold area 64 having an outer feedport 66, the features of which have been discussed above.

The thermal energy storage apparatus 106 also has a tankless structure 110 which is configured to contain the phase change medium 104 such that the inner manifold area 60, the intermediate manifold area 78, and the outer manifold area 64 are substantially immersed in the phase change medium 104. In this embodiment, the tankless structure 110 is constructed of dry-stacked bricks 112. Since the bricks 112 are dry-stacked, they will have inherent small gaps and spaces between them. These spaces 114 have been exaggerated in the drawing to facilitate discussion of the thermal energy storage apparatus 106.

Suitable examples of materials which the bricks 112 may be constructed from include, but are not limited to firebrick, refractory material, castable refractories, refractory brick, mixtures of alumina (Al2O3), silica (SiO2), magnesia (MgO), zirconia (ZrO2), chromium oxide (Cr2O3), iron oxide (Fe2O3), calcium oxide (CaO), silicon carbide (SiC), carbon (C); metallic materials, plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

Since the thermal energy storage apparatus 106 has a tankless structure 110, the phase change medium 104 will tend to leak through the gaps 114 in the bricks 112 when it is in a liquid state. For this reason, it is preferred to size the bricks 112 such that they have a cooling zone 116 which encourages the phase change medium 104 to solidify 118 in at least a portion of the gaps 114 defined by the bricks 112. Thus, when the phase change medium 104 is first liquefied, it can seep into the gaps 114 and then cool at some point within the gaps 114 to substantially seal itself 118 to prevent leakage of the phase change medium 104 from the tankless structure 110. The tankless structure 110 does not have the corrosive concerns of typical single or multiple tank systems, it will last longer, it is less expensive to construct, and it is easily scalable. The tankless structure 110 is also suitable for use in seismic regions because it remains flexible due to its dry-stacked and self-sealing nature. Although the illustrated embodiment shows a single layer of bricks 112, other embodiments may utilize multiple layers of bricks 112.

The tankless structure 110 may define a variety of horizontal cross-sectional shapes, such as, but not limited to circular, oval, hexagonal, rectangular, and square. However, since the heat exchanger 108 is configured to take advantage of radial heat differences within the tankless structure 110, a circular horizontal cross-sectional shape defined by the tankless structure 110 is preferred for even heat distribution. A tankless structure 110 which defines a circular horizontal cross-sectional shape will also have reduced mechanical stresses since it will not have corners.

The thermal energy storage apparatus 106 also has a base 120 which supports the tankless structure 110. Although the base 120 is illustrated as being smooth and level, the base 120 in other embodiments may have other profiles. The base 120 may be earth or some structure which is stacked, formed, poured, set, filled or otherwise constructed in place to support the tankless structure 110. Suitable materials for the base 120 include, but are not limited to earth, firebrick, refractory material, concrete, castable refractories, refractory concrete, refractory cement, insulating refractories, gunning mixes, ramming mixes, refractory plastics, refractory brick, mixtures of alumina (Al2O3), silica (SiO2), magnesia (MgO), zirconia (ZrO2), chromium oxide (Cr2O3), iron oxide (Fe2O3), calcium oxide (CaO), silicon carbide (SiC), carbon (C); metallic materials, carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromiumvanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, nickel-chromium-molybdenum, and any combination thereof.

A support 122 may be provided to support the heat exchanger 108 on the base 120.

Figure 10B:
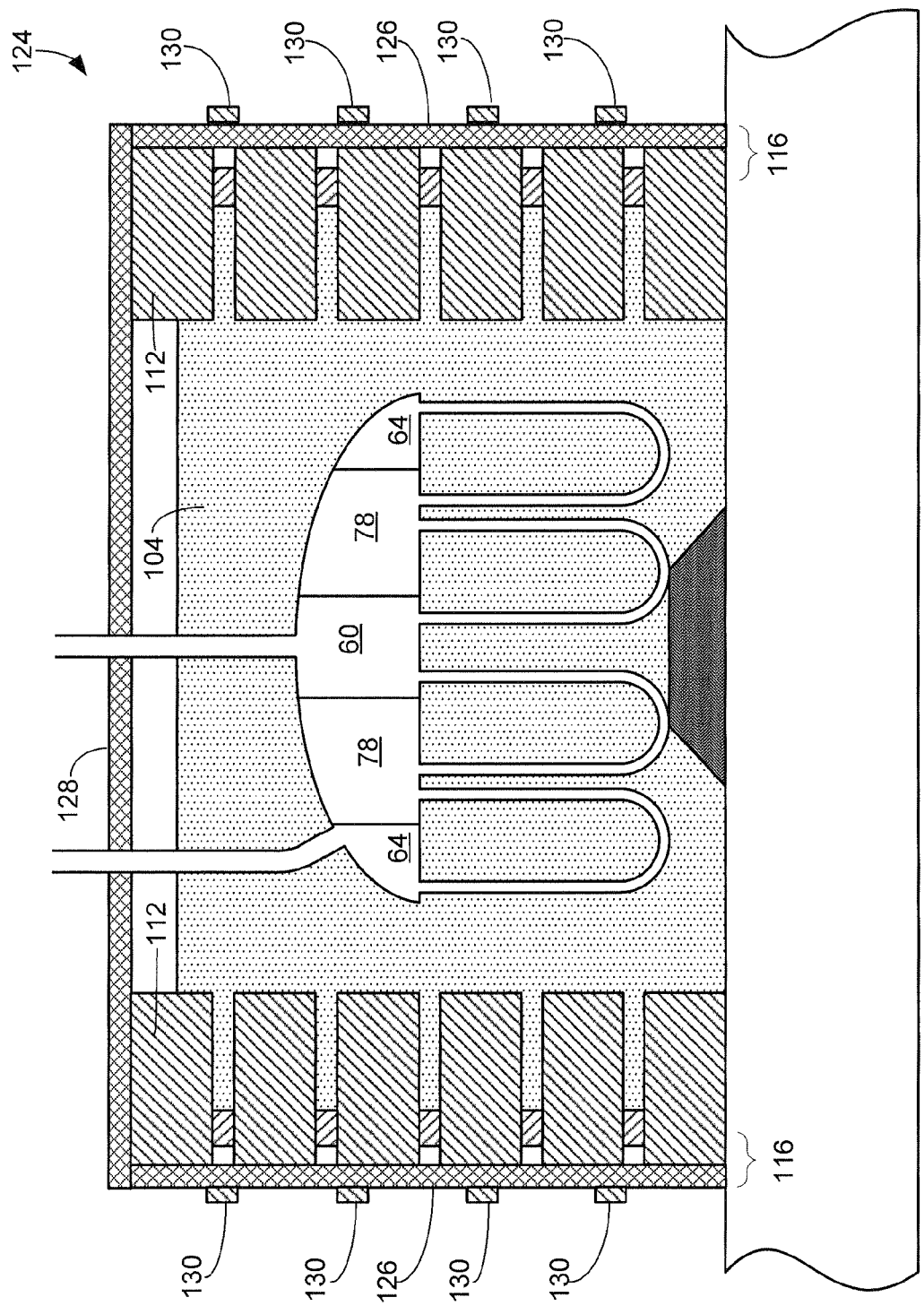
FIG. 10B schematically illustrates a further embodiment of a thermal energy storage apparatus.

FIG. 10B schematically illustrates a side cross-sectional view of a further embodiment of a thermal energy storage apparatus 124. This embodiment of a thermal energy storage apparatus 124 has all the features of the apparatus in FIG. 10A with some added features. At least one layer of insulation 126 may be provided to substantially surround the bricks 112 of the tankless structure 110 thereby helping to reduce heat loss and prolong the energy storage time of the thermal energy storage apparatus 124. Care should be taken that the insulation 126 is not so thick that it prevents the bricks 112 from having a cooling zone 116, otherwise the phase change medium 104 may leak out of the tankless structure 110. Additionally or optionally, a top layer of insulation 128 may be placed over the tankless structure 110. One or more bands 130 may be placed around the tankless structure 110 and the insulation 126 to support the bricks 112.

Figure 10C:
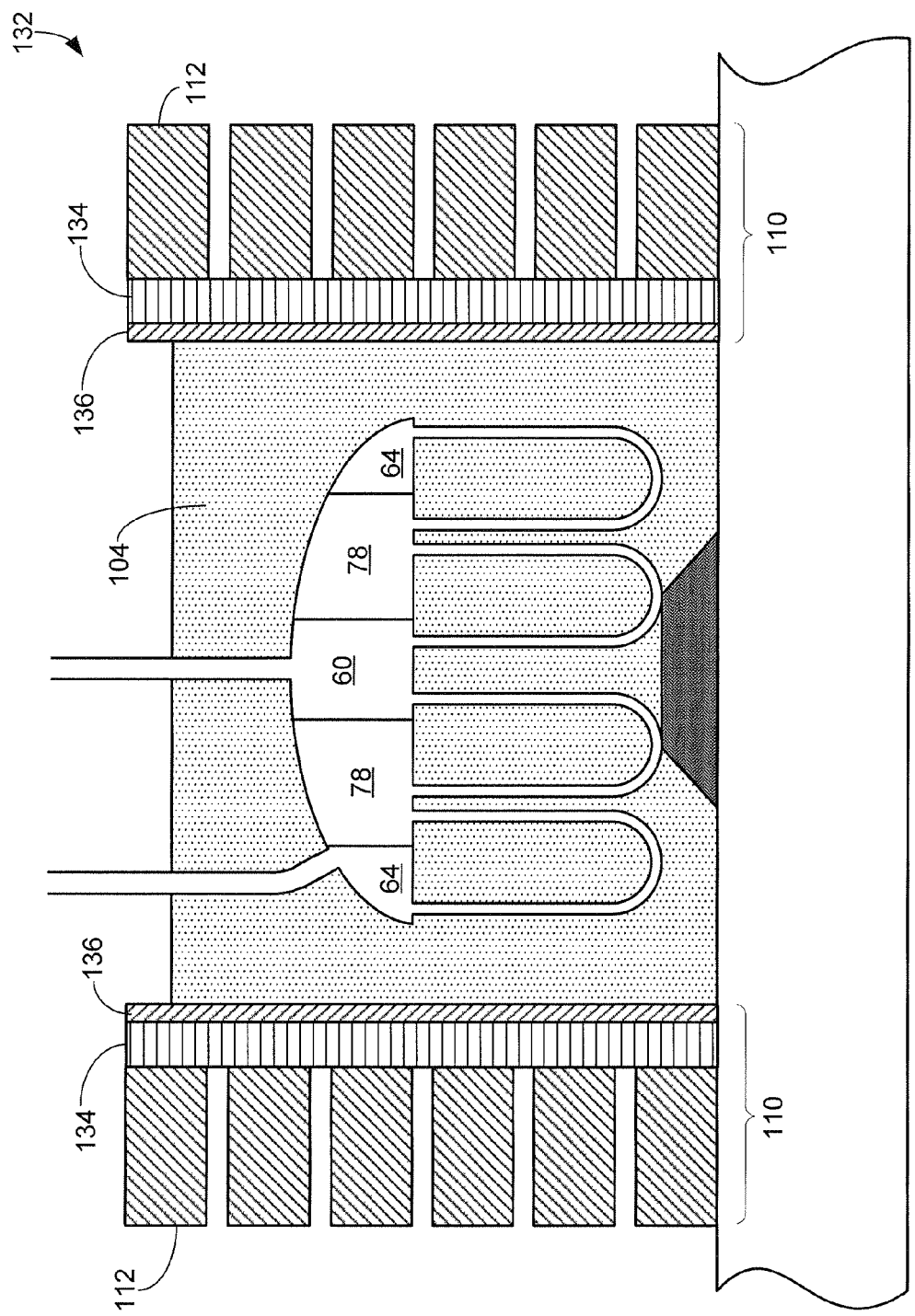
FIG. 10C schematically illustrates another embodiment of a thermal energy storage apparatus.

FIG. 10C schematically illustrates a side cross-sectional view of a further embodiment of a thermal energy storage apparatus 132. This embodiment of a thermal energy storage apparatus 132 has all the features of the apparatus in FIG. 10A with some added features. At least one refractory liner layer may be formed as part of the tankless structure 110 to help contain the phase change medium 104. In the illustrated embodiment, two liner layers are illustrated, a low density refractory material liner 134 and a high density refractory material liner 136. The lower density refractory liner 134 may be selected to have good thermal properties, but will often be relatively porous, and therefore may tend to allow the liquid phase change medium 104 to leak out. The higher density refractory liner 136 may be selected to be less-porous to help contain the liquid phase change medium 104. The dry-stacked bricks may still surround the liners 134, 136 and can have cooling zones to help contain any phase change medium which might find its way out of the potentially porous one or more liners.

Figure 10D:
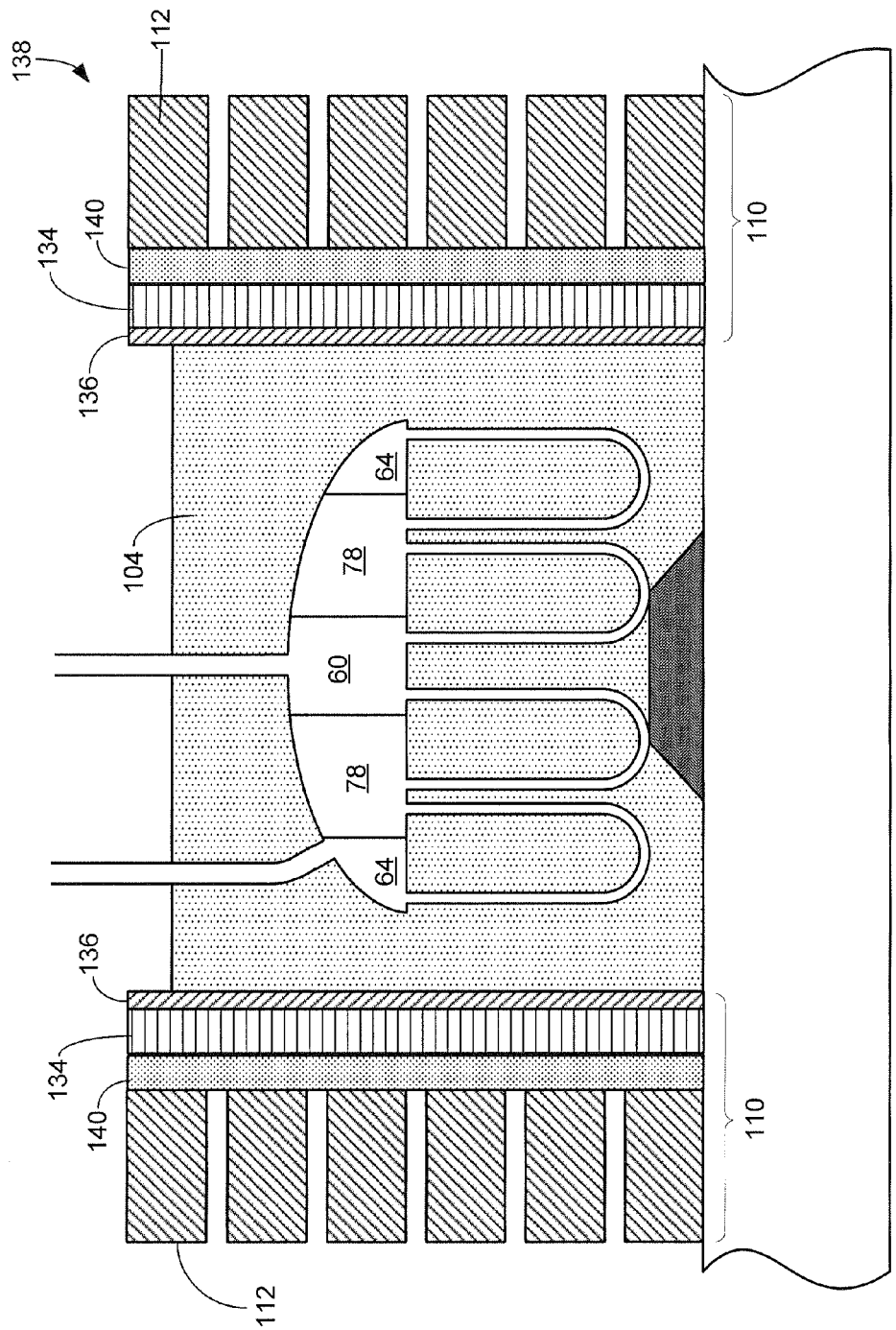
FIG. 10D schematically illustrates a further embodiment of a thermal energy storage apparatus.

FIG. 10D schematically illustrates a side cross-sectional view of a further embodiment of a thermal energy storage apparatus 138. This embodiment of a thermal energy storage apparatus 138 has all the features of the apparatus in FIG. 10C with an added feature. A filler layer 140 may be formed as part of the tankless structure 110 to help contain the phase change medium 104. In the illustrated embodiment, the filler layer 140 is shown as having been formed between the low density refractory material liner 134 and the dry-stacked bricks 112. The filler layer 140 may be sand, fiberglass, or some other material which will not be burnt by the high operating temperatures of the thermal energy storage apparatus. The filler layer 140 can help to prevent leaks from the tankless structure 110 since it tends not to be permeable to the phase change medium 104. Furthermore, the filler layer 140 tends to allow for expansion and contraction of the phase change medium 104, thereby reducing stress on the bricks 112.

Figure 10E:
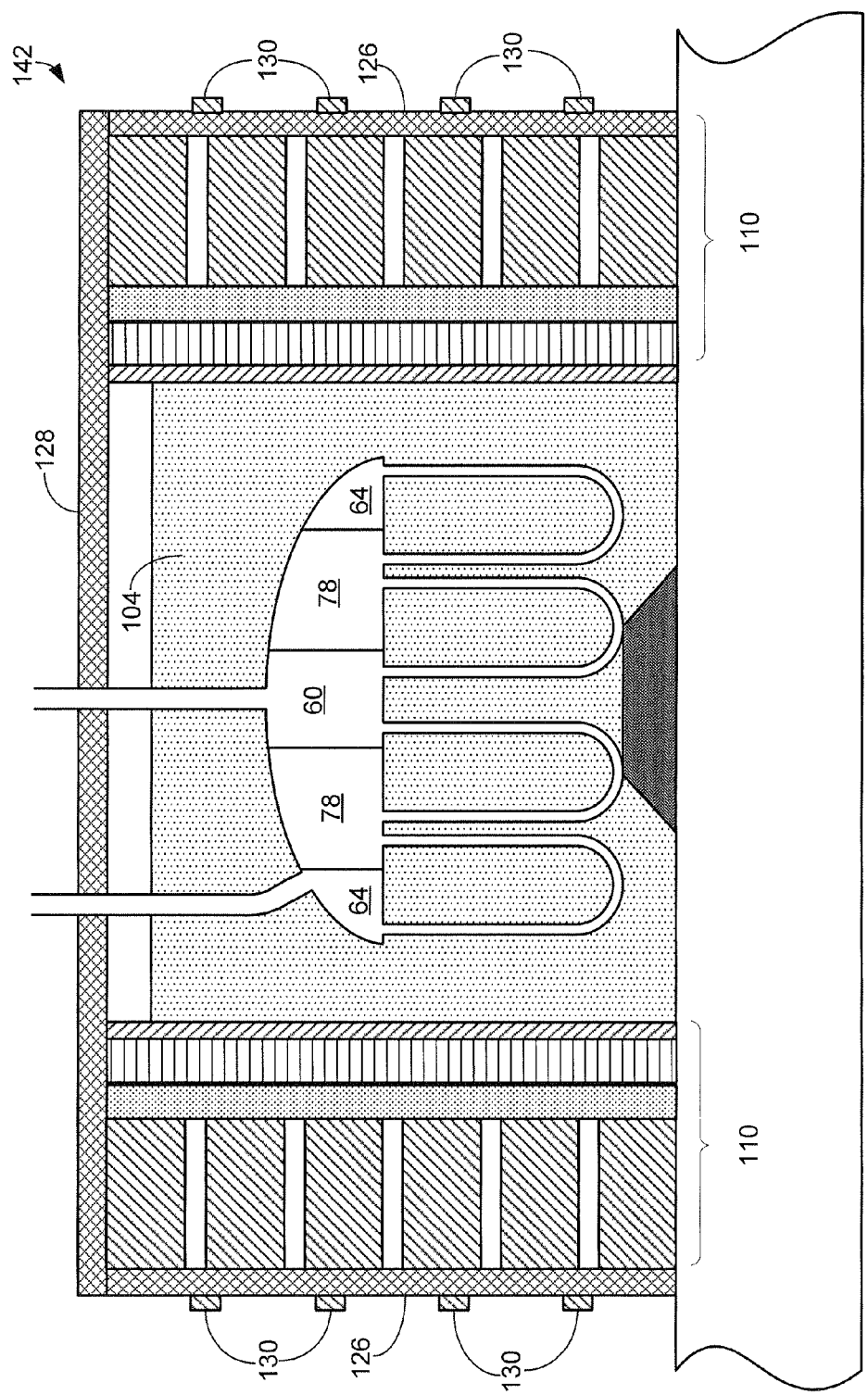
FIG. 10E schematically illustrates another embodiment of a thermal energy storage apparatus.

FIG. 10E schematically illustrates a side cross-sectional view of a further embodiment of a thermal energy storage apparatus 142. This embodiment of a thermal energy storage apparatus 142 has all the features of the apparatus in FIG. 10D with some added features. At least one layer of insulation 126 may be provided to substantially surround the bricks 112 of the tankless structure 110 thereby helping to reduce heat loss and prolong the energy storage time of the thermal energy storage apparatus 142. Care should be taken that the insulation 126 is not so thick that it prevents the bricks 112 from having a cooling zone, otherwise the phase change medium 104 may leak out of the tankless structure 110. Additionally or optionally, a top layer of insulation 128 may be placed over the tankless structure 110. One or more bands 130 may be placed around the tankless structure 110 and the insulation 126 to support the bricks 112.

Figure 11A:
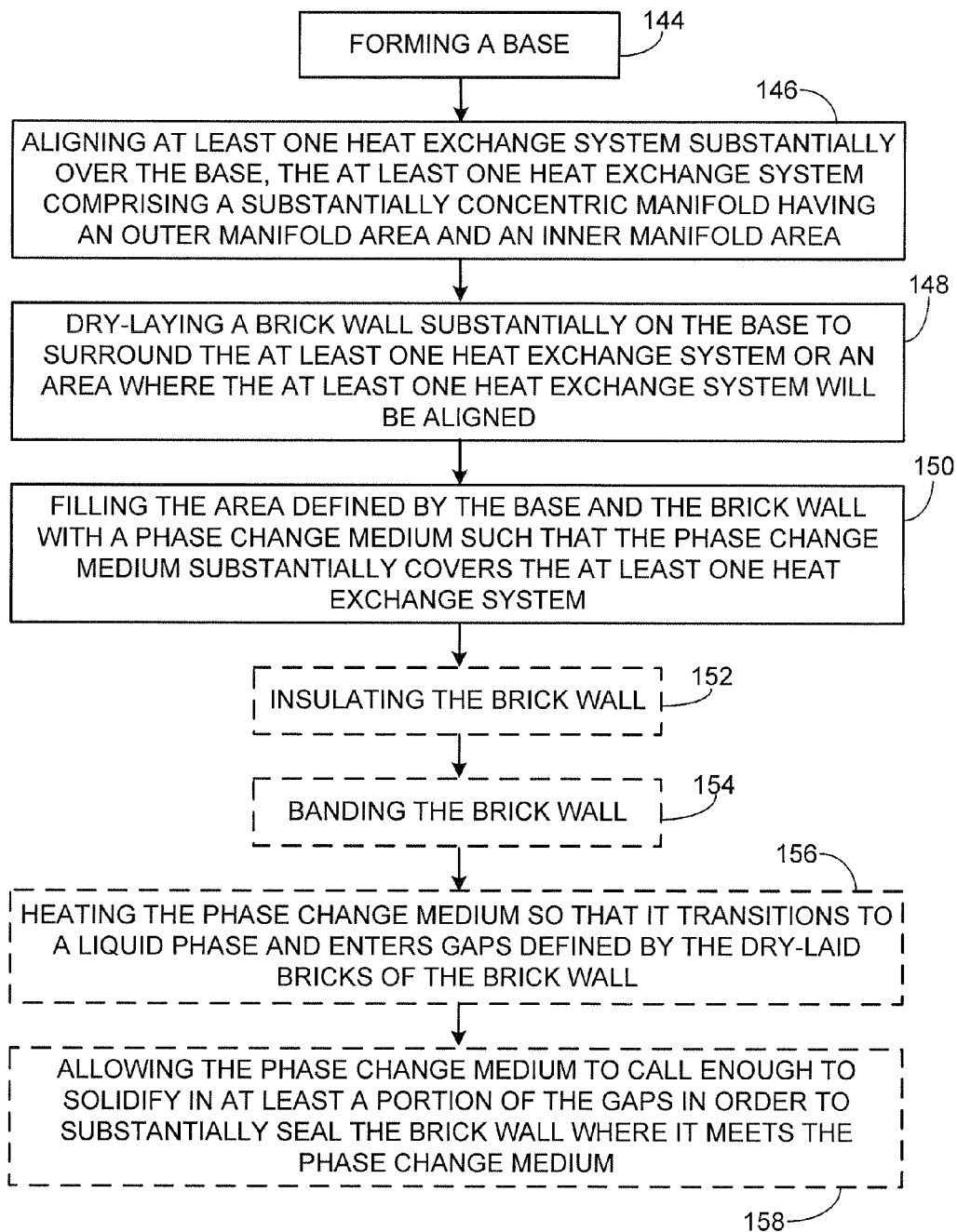
FIG. 11A illustrates an embodiment of a method for constructing a thermal energy storage system.

FIG. 11A illustrates an embodiment of a method for constructing a thermal energy storage system. A base is formed 144. This can include clearing or defining a space on the earth, or it can include forming, laying, pouring, setting, or otherwise building or defining the base on or above a surface. The base may optionally be formed on an insulator. At least one heat exchange system is aligned 146 substantially over the base. The at least one heat exchange system has a substantially concentric manifold having at least an outer manifold area and an inner manifold area. Suitable example embodiments of heat exchangers have been discussed herein. A brick wall is dry-laid 148 substantially on the base to surround the at least one heat exchange system or an area where the at least one heat exchange system will be aligned. This takes into account construction methods which first align the heat exchange system over the base and then dry-lay the brick wall around the heat exchange system as well as construction methods which first dry-lay the brick wall and then align the heat exchange system over the base within the brick wall. The area defined by the base and the brick wall are then filled 150 with a phase change medium such that the phase change medium substantially covers the at least one heat exchange system. The brick wall may optionally be insulated 152. The brick wall may optionally be banded 154 for added strength and stability.

Since the thermal energy storage system is a tankless system, the phase change medium may optionally be heated 156 so that it transitions to a liquid phase and enters gaps defined by the dry-laid bricks of the brick wall. Then, the phase change medium may optionally be allowed 158 to cool enough to solidify in at least a portion of the gaps in order to substantially seal the brick wall where it meets the phase change medium.

Figure 11B:
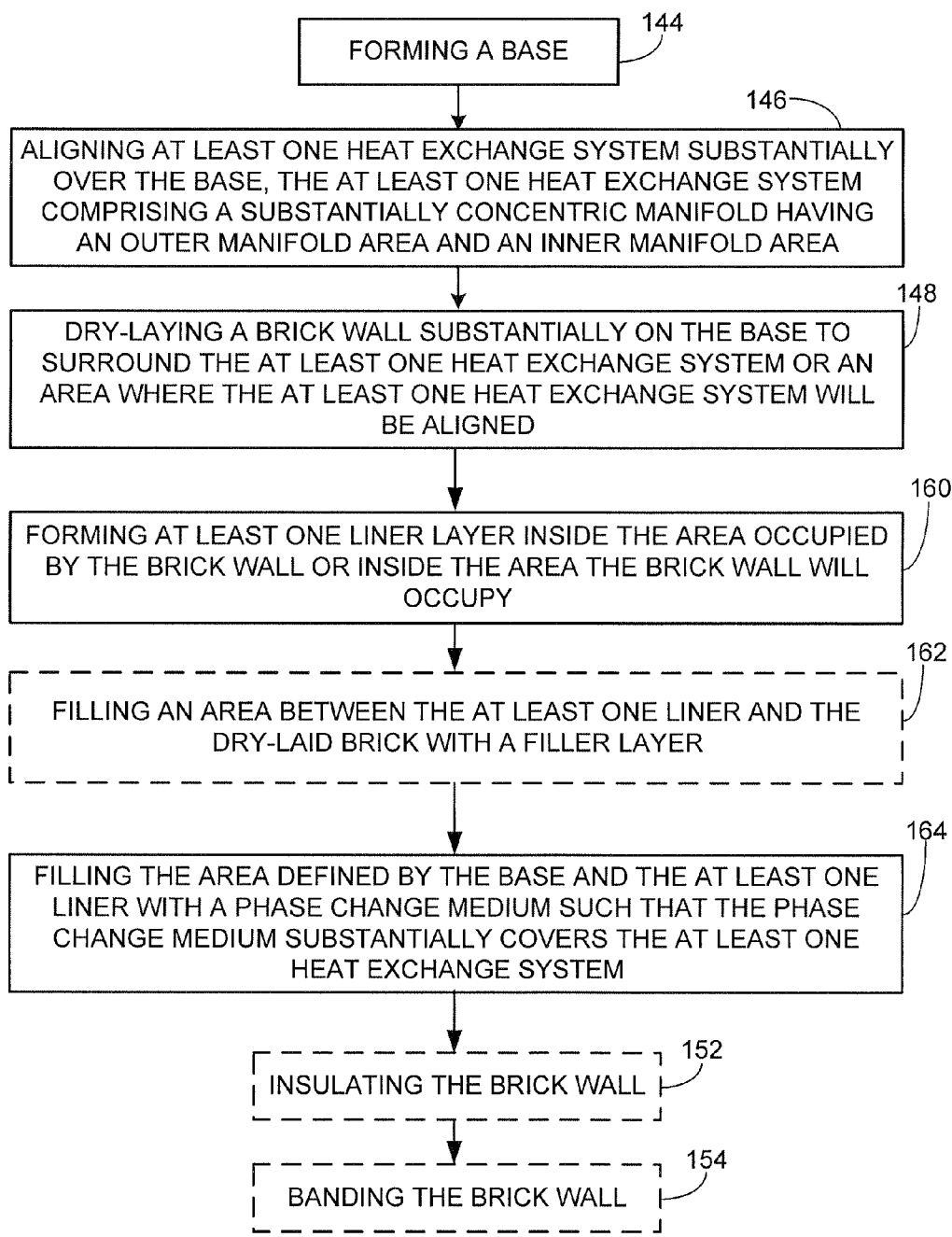
FIG. 11B illustrates another embodiment of a method for constructing a thermal energy storage system.

FIG. 11B illustrates another embodiment of a method for constructing a thermal energy storage system. A base is formed 144. This can include clearing or defining a space on the earth, or it can include forming, laying, pouring, setting, or otherwise building or defining the base on or above a surface. The base may optionally be formed on an insulator. At least one heat exchange system is aligned 146 substantially over the base. The at least one heat exchange system has a substantially concentric manifold having at least an outer manifold area and an inner manifold area. Suitable example embodiments of heat exchangers have been discussed herein. A brick wall is dry-laid 148 substantially on the base to surround the at least one heat exchange system or an area where the at least one heat exchange system will be aligned. This takes into account construction methods which first align the heat exchange system over the base and then dry-lay the brick wall around the heat exchange system as well as construction methods which first dry-lay the brick wall and then align the heat exchange system over the base within the brick wall. At least one refractory liner layer is formed 160 inside the area occupied by the brick wall or inside the area the brick wall will occupy. This takes into account construction methods which dry-lay the brick wall before forming the at least one refractory liner and visa versa. The at least one refractory liners may be relatively low density and therefore more porous or relatively high density and therefore less porous. Optionally, an area between the at least one refractory liner and the dry-laid brick may be filled 162 with a filler layer such as sand or fiberglass. The area defined by the base and the at least one refractory liner is then filled 164 with a phase change medium such that the phase change medium substantially covers the at least one heat exchange system. The brick wall may optionally be insulated 152. The brick wall may optionally be banded 154 for added strength and stability.

Figure 12:
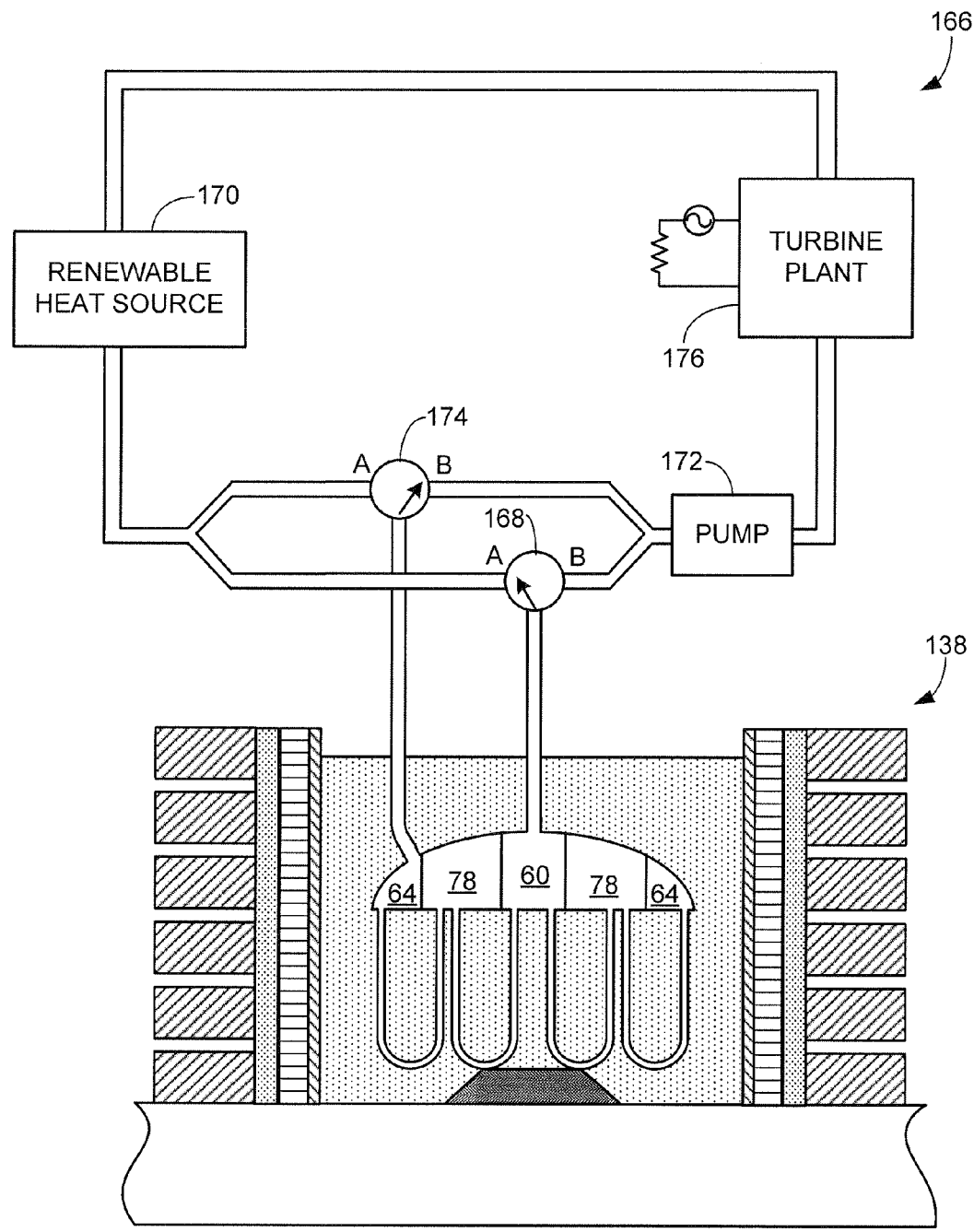
FIG. 12 schematically illustrates an embodiment of a thermal energy power system.

FIG. 12 schematically illustrates an embodiment of a thermal energy power system 166. The thermal energy power system 166 has a thermal energy storage apparatus 138, the features of which have been discussed above with regard to FIG. 10D. Other embodiments of thermal energy power systems may have other embodiments of thermal energy storage apparati as have also been discussed above with numerous examples and their equivalents. The thermal energy power system 166 has at least one inner valve 168 which may be used to selectably and fluidically couple the inner manifold area 60 to either a renewable heat source 170 or a pump 172. Suitable examples of a renewable heat source 170 include, but are not limited to solar cells, solar mirror arrays, and wind turbines. Other non-limiting examples of renewable heat sources 170 may include industrial stack heat and/or excess heat which is the by-product of industrial, municipal, institutional, individual, or other activity. For example, a manufacturing plant which operates during the day may generate heat which can be stored to supply power for other activities at a later time. Heat transfer fluid is preferably used to remove heat from the renewable heat source 170 and transfer it throughout the system when moved by the pump 172. The thermal energy power system 166 also has at least one outer valve 174 which may be used to selectably and fluidically couple the outer manifold area 64 to either the renewable heat source 170 or the pump 172. The inner manifold area 60 and the outer manifold area 64 are reversibly connected in a closed loop with the pump 172, the renewable heat source 170, and a turbine plant 176. The reversible connection can be made possible by a variety of valve devices, the illustrated inner and outer selection valves 168, 174 being only one example. The turbine plant 176 uses heat delivered to it by the pump from the renewable heat source 170 or the thermal energy storage apparatus 138 to generate steam which drives generators to make electricity.

Figure 13:
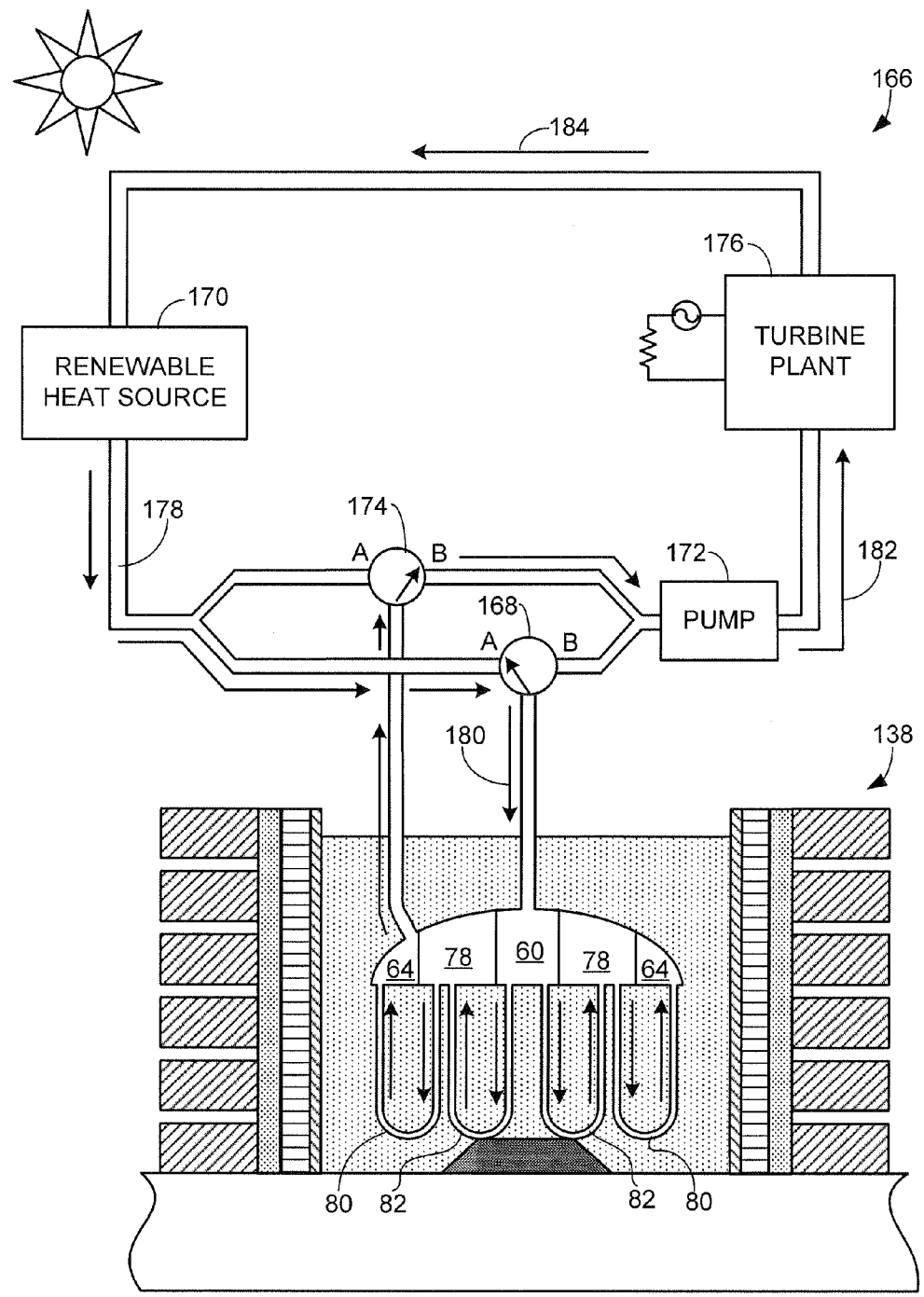
FIG. 13 schematically illustrates flow through the embodied thermal energy power system of FIG. 12 during a heating mode.

FIG. 13 schematically illustrates flow through the embodied thermal energy power system of FIG. 12 during a heating mode. During this heating mode, the renewable energy source 170 is available (producing heat), for example, when the sun is shining on a solar array. The inner selection valve 168 is set to a first position (position A in the drawing) which couples heated heat transfer fluid 178 from the renewable heat source 170 to the inner manifold area 60 of the thermal energy storage apparatus 138. The outer selection valve 174 is set to a second position (position B in the drawing) which fluidically couples the outer manifold area 64 to the turbine plant 176. In this embodiment, the pump 172 is in the fluid path from the outer manifold area 64 to the turbine plant 176 to provide the force to move the thermal transfer fluid through the power system. Other embodiments may place the pump in different locations or use more than one pump. Thermal transfer fluid from the turbine plant 176 is then coupled back to the renewable heat source 170.

During operation, the heat transfer fluid 178 which is heated by the renewable heat source 170 passes into 180 the inner manifold area and down and back up the second set of U-tubes 82 within the approximate center of the phase change media to the intermediate manifold area 78. Heat from the heat transfer fluid is transferred to and stored by the phase change media. The heat transfer fluid then passes down and back up the first set of U-tubes 80 to the outer manifold area 64. The heat transfer fluid, having given-up some of its heat to the phase change media may then be pushed 182 to the turbine plant 176 if it still has enough heat to generate steam. Alternatively, the heat transfer fluid may be routed back to the renewable heat source or augmented with a separate line of hot heat transfer fluid from the renewable heat source before being sent to the turbine plant. The cooled heat transfer fluid leaving the turbine plant is returned 184 to the renewable heat source for further heating.

Figure 14:
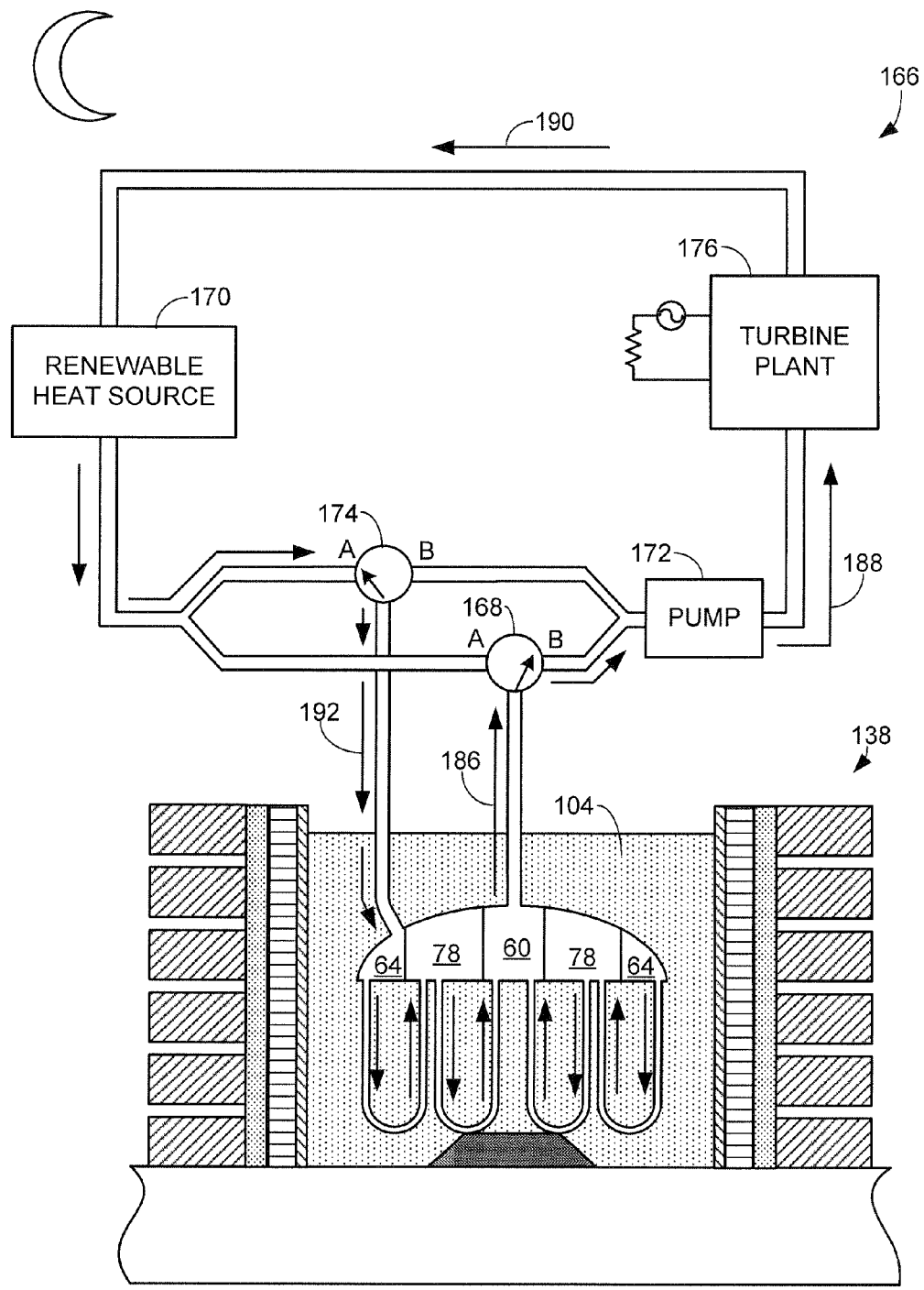
FIG. 14 schematically illustrates flow through the embodied thermal energy power system of FIG. 12 during a cooling mode.

FIG. 14 schematically illustrates flow through the embodied thermal energy power system of FIG. 12 during a cooling mode. During this cooling mode, the renewable energy source 170 is not available (not producing heat), for example, when the sun is not shining on a solar array. The outer selection valve 174 is set to a first position (position A in the drawing) which fluidically couples the outer manifold area 64 to the renewable heat source which is currently not generating heat. The inner selection valve 168 is set to a second position (position B in the drawing) which couples heated heat transfer fluid (heated by the phase change media 104) from the inner manifold area 60 of the thermal energy storage apparatus 138 to the to the turbine plant 176. In this embodiment, the pump 172 is in the fluid path from the inner manifold area 60 to the turbine plant 176 to provide the force to move the thermal transfer fluid through the power system. Other embodiments may have the pump in different locations or use more than one pump. Thermal transfer fluid from the turbine plant 176 is then coupled back to the renewable heat source 170, or alternately may bypass the renewable heat source since if it is not contributing to the system.

During operation, the heat transfer fluid which is heated by the phase change medium passes 186 out of the inner manifold area and is pushed 188 to the turbine plant for generating steam. The heat transfer fluid is cooled after leaving the turbine plant and is recirculated 190 back to the renewable heat source (which is currently not producing heat). The heat transfer fluid is then moved 192 into the outer manifold area, down and back up the first set of U-tubes 80 to the intermediate manifold area 78, and down and back up the second set of U-tubes 82 to the inner manifold area 60. During this outer-to-inner passing of the heat transfer fluid, the heat transfer fluid may be heated again to power the turbine plant. In alternate embodiments, the cooled heat transfer fluid which leaves the turbine plant may be routed to circumvent the renewable heat source, which is not producing heat, directly back into the outer manifold area.

Figure 15:
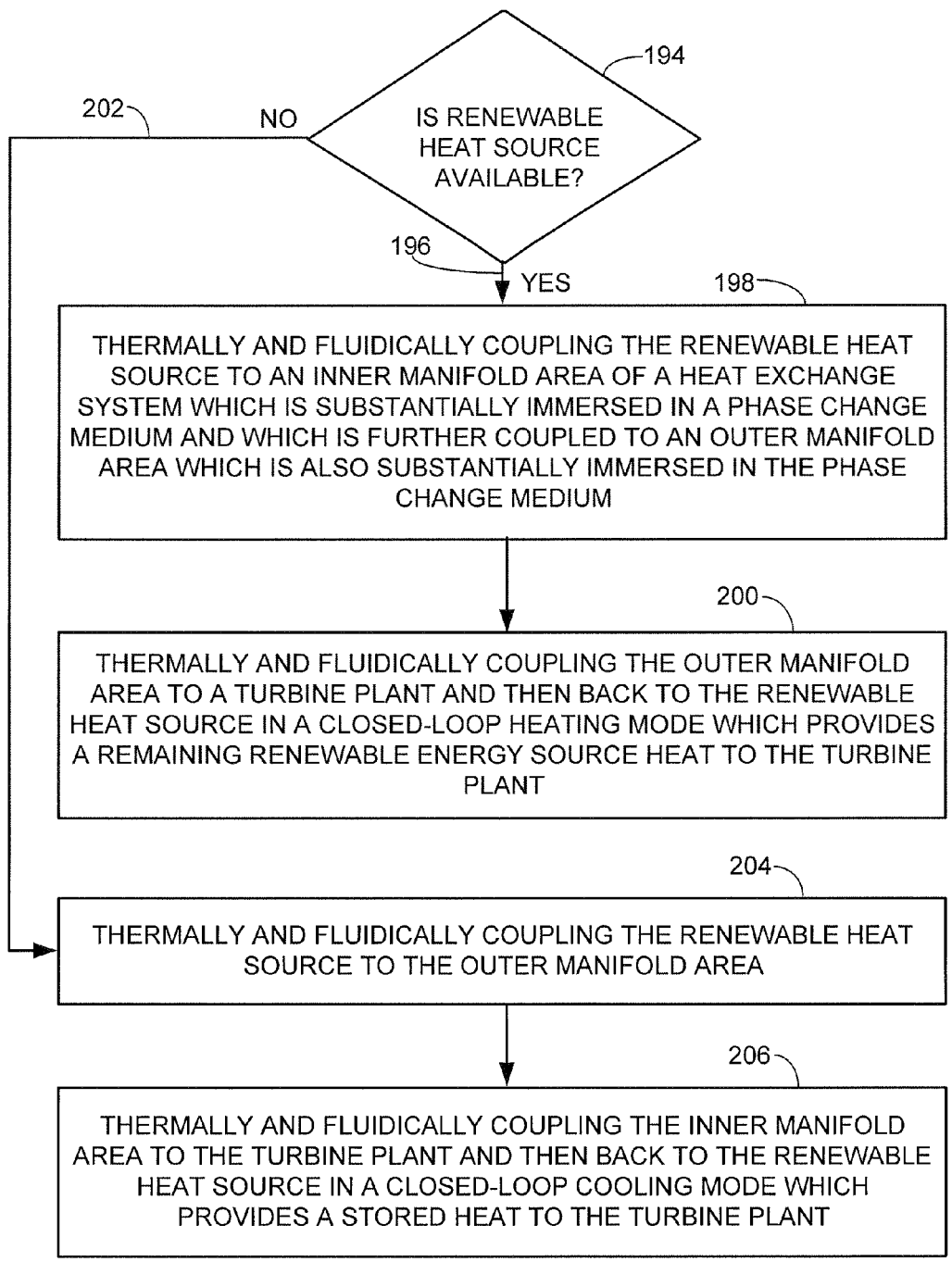
FIG. 15 illustrates an embodiment of a method for controlling a thermal energy storage system.

FIG. 15 illustrates an embodiment of a method for controlling a thermal energy storage system. A determination is made 194 as to whether a renewable heat source is available. When a renewable heat source is available 196: i) the renewable heat source is thermally and fluidically coupled 198 to an inner manifold area of a heat exchange system which is substantially immersed in a phase change medium and which is further coupled (directly or indirectly) to an outer manifold area of the heat exchange system which is also substantially immersed in the phase change medium; and ii) the outer manifold area is thermally and fluidically coupled 200 to a turbine plant and then back to the renewable heat source in a closed-loop heating mode which provides a remaining renewable energy source heat to the turbine plant. When the renewable heat source is not available 202: i) the renewable heat source is thermally and fluidically coupled 204 to the outer manifold area; and ii) the inner manifold area is thermally and fluidically coupled 206 to the turbine plant and then back to the renewable heat source in a closed-loop cooling mode which provides a stored heat to the turbine plant.

Figure 16:
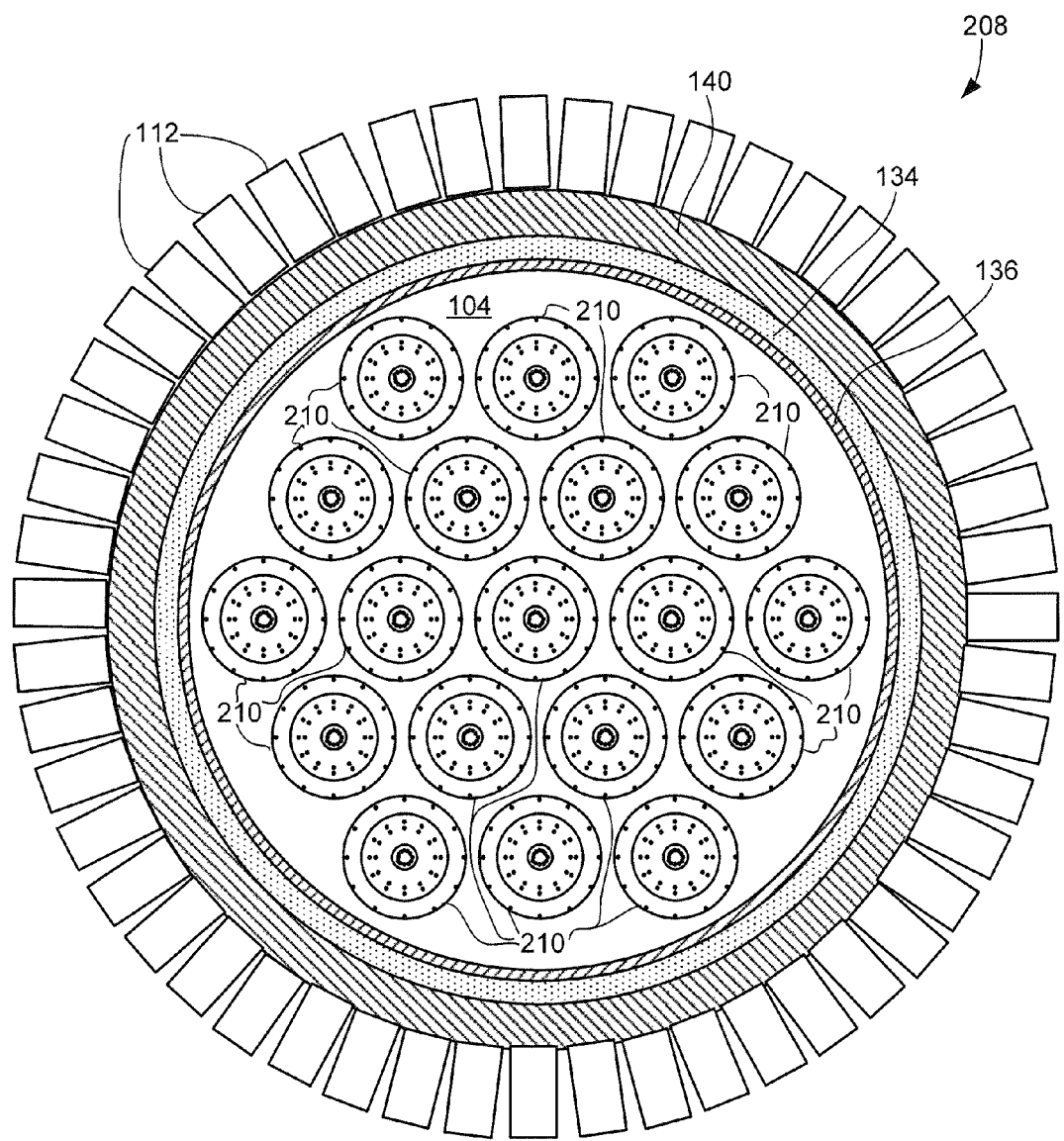
FIG. 16 schematically illustrates a top cross-sectional view of another embodiment of a thermal energy storage system.

The embodied thermal energy storage system disclosed herein, as well as their equivalents, are designed to be easily scalable from about 50 kilowatt-hours (kWhr) to 500 MWhr or more of storage capacity, by way of example. The thermal energy storage system is easily configured to optimize ease of changing fluid temperatures (since this can be different at different installations), phase change medium makeup (since different phase change media have optimum characteristics at the different operating temperatures), and heat transfer fluids (these also vary at installations). Heat exchanger tube spacing, the number of tubes, and the number of passes can be separately adjusted, depending on the embodiment. Furthermore, the disclosed heat exchangers and their equivalents are designed to be modular, such that multiple heat exchangers of a convenient size may be installed within a larger sized thermal energy storage system, such at the one schematically illustrated in FIG. 16.

The thermal energy storage system 208 has a tankless structure comprising dry-laid bricks 112, a filler layer 140, a low-density castable refractory liner 134, and a high density castable refractory liner 136, the features of which have been discussed above. Other embodiments may omit one or more of the liners and/or the filler layer. A phase change medium 104 is held within the tankless structure. Substantially submersed in the phase change medium 104 are a plurality of heat exchangers 210. In some applications, depending on the size of the tankless structure, it may not be convenient or practical to construct a single heat exchanger which is large enough to fill the tankless structure. Furthermore, it may be preferable to construct the heat exchanger off-site, and certain size heat exchangers may prove large to effectively move to the installation site. In these situations, multiple heat exchangers 210 of a more convenient and/or modular size may be installed in the thermal energy storage system 208. The multiple heat exchangers 210 may be coupled in parallel or in series. Furthermore, the multiple heat exchangers 210 may be bypassable in order to allow one or more heat exchange units to be bypassed for repairs or scheduled maintenance while not shutting-down the entire thermal energy storage system 208.

Having thus described several embodiments of the claimed invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and the scope of the claimed invention. Additionally, the recited order of the processing elements or sequences, or the use of numbers, letters, or other designations therefore, is not intended to limit the claimed processes to any order except as may be specified in the claims. Accordingly, the claimed invention is limited only by the following claims and equivalents thereto.

What is claimed is:

1. The thermal energy storage apparatus comprising:
    a phase change medium;
    an inner manifold area having at least one inner feed port;
    an outer manifold area having at least one outer feed port and fluidically coupled to the inner manifold area;
    at least one intermediate manifold area;
    a first plurality of U-tubes coupled between the outer manifold area and the at least one intermediate manifold area; and
    a second plurality of U-tubes coupled between the at least one intermediate manifold area and the inner manifold area;
    wherein the outer manifold area surrounds the inner manifold area, and wherein the inner manifold area and the outer manifold area are configured to be substantially immersed in the phase change medium, and wherein the inner manifold area is fluidically coupled to the outer manifold area via the second plurality of U-tubes, the at least one intermediate manifold area, and the first plurality of U-tubes.

2. The thermal energy storage apparatus of claim 1, wherein the phase change medium is selected from the group consisting of a salt, a salt mixture, a eutectic salt mixture, lithium nitrate, potassium nitrate, sodium nitrate, sodium nitrite, calcium nitrate, lithium carbonate, potassium carbonate, sodium carbonate, rubidium carbonate, magnesium carbonate, lithium hydroxide, lithium fluoride, beryllium fluoride, potassium fluoride, sodium fluoride, calcium sulfate, barium sulfate, lithium sulfate, lithium chloride, potassium chloride, sodium chloride, iron chloride, tin chloride, and zinc chloride.

3. The thermal energy storage apparatus of claim 1, wherein the inner manifold area is centered within the outer manifold area.

4. The thermal energy storage apparatus of claim 1, wherein the inner manifold area and the outer manifold area lie on substantially the same plane.

5. The thermal energy storage apparatus of claim 1, further comprising one or more core heat tubes coupled to the inner manifold area.

6. The thermal energy storage apparatus of claim 1, wherein at least one of the U-tubes from the second plurality of U-tubes comprises a bypass valve configured to selectably create a hot spot in the phase change medium.

7. The thermal energy storage apparatus of claim 1, further comprising a tankless structure configured to contain the phase change medium such that the inner manifold area, the intermediate manifold area, and the outer manifold area are substantially immersed in the phase change medium.

8. The thermal energy storage apparatus of claim 7, wherein the tankless structure comprises bricks.

9. The thermal energy storage apparatus of claim 8, wherein the bricks comprise a material selected from the group consisting of firebrick, refractory material, castable refractories, refractory brick, mixtures of alumina (Al2O3), silica (SiO2), magnesia (MgO), zirconia (ZrO2), chromium oxide (Cr2O3), iron oxide (Fe2O3), calcium oxide (CaO), silicon carbide (SiC), carbon (C); metallic materials, plain carbon steels; alloy steels, manganese, silicon, silicon-manganese, nickel, nickel-chromium, molybdenum, nickel-molybdenum, chromium, chromium-molybdenum, chromiummolybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, and nickel-chromium-molybdenum.

10. The thermal energy storage apparatus of claim 8, further comprising at least one layer of insulation substantially surrounding the bricks.

11. The thermal energy storage apparatus of claim 10, further comprising at least one band supporting the bricks.

12. The thermal energy storage apparatus of claim 8, wherein the bricks are configured to have a cooling zone which encourages the phase change medium to solidify in at least a portion of gaps defined by the bricks.

13. The thermal energy storage apparatus of claim 8, wherein the tankless structure further comprises at least one liner layer.

14. The thermal energy storage apparatus of claim 13, wherein the at least one liner layer comprises a castable low-density refractory material.

15. The thermal energy storage apparatus of claim 13, wherein the at least one liner layer comprises a castable high-density refractory material.

16. The thermal energy storage apparatus of claim 13, wherein the at least one liner layer comprises:
an outer liner comprising a castable low-density refractory material; and
an inner liner comprising a castable high-density refractory material.

17. The thermal energy storage apparatus of claim 16, wherein the inner liner is thinner than the outer liner.

18. The thermal energy storage apparatus of claim 13, further comprising a filler layer between the bricks and the at least one liner layer.

19. The thermal energy storage apparatus of claim 18, wherein the filler layer is selected from the group consisting of sand and fiberglass.

20. The thermal energy storage apparatus of claim 7, further comprising a base which supports the tankless structure.

21. The thermal energy storage apparatus of claim 20, wherein the base comprises a material selected from the group consisting of earth, firebrick, refractory material, concrete, castable refractories, refractory concrete, refractory cement, insulating refractories, gunning mixes, ramming mixes, refractory plastics, refractory brick, mixtures of alumina ($Al_2O_3$), silica ($SiO_2$), magnesia (MgO), zirconia ($ZrO_2$), chromium oxide ($Cr_2O_3$), iron oxide ($Fe_2O_3$), calcium oxide (CaO), silicon carbide (SiC), carbon (C); metallic materials, carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium-molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromium-vanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, and nickel-chromium-molybdenum.

22. The thermal energy storage apparatus of claim 7, wherein the outer manifold area has a shape which substantially follows a shape defined by the tankless structure.

23. The thermal energy storage apparatus of claim 7, wherein the tankless structure defines a horizontal cross-sectional shape which is selected from the group consisting of circular, oval, hexagonal, rectangular, and square.

24. The thermal energy storage apparatus of claim 1, further comprising:
at least one inner valve;
at least one outer valve;
an inner pipe which couples the inner valve to the inner feed port; and
an outer pipe which couples the outer valve to the outer feed port.

25. The thermal energy storage apparatus of claim 24, wherein the inner pipe and the outer pipe enter the phase change medium substantially vertically.

26. The thermal energy storage apparatus of claim 24, wherein the inner pipe and the outer pipe enter the phase change medium substantially horizontally.

27. The thermal energy storage apparatus of claim 1, wherein the inner manifold area and the outer manifold area comprise material selected from the group consisting of plain carbon steels; alloy steels, manganese, silicon, silicon-manganese, nickel, nickel-chromium, molybdenum, nickel-molybdenum, chromium, chromium-molybdenum, chromium-molybdenum-cobalt, silicon-molybdenum, manganese-silicon-molybdenum, nickel-chromium—molybdenum, silicon-chromium-molybdenum, manganese-chromium-molybdenum, manganese-silicon-chromium-molybdenum, vanadium, chromium-vanadium, silicon-chromium-vanadium, manganese-silicon-chromium-vanadium, chromiumvanadium-molybdenum, manganese-silicon-chromium-vanadium-molybdenum, chromium-tungsten, chromium-tungsten-molybdenum, chromium-tungsten-vanadium, chromium-vanadium-tungsten-molybdenum, chromium-vanadium-tungsten-cobalt, chromium-vanadium-tungsten-molybdenum-cobalt; stainless steels, austenitic, ferritic, martensitic, duplex, precipitation-hardening, superaustenitic, superferritic; nickel alloys, nickel-chromium-iron, nickel-chromium-iron-aluminum, nickel-chromium-iron-aluminum-titanium, nickel-chromium-iron-aluminum-titanium-niobium, nickel-chromium-iron-cobalt-molybdenum, nickel-chromium-iron-niobium, nickel-chromium-iron-molybdenum-niobium, nickel-chromium-iron-molybdenum-niobium-titanium-aluminum, nickel-chromium-molybdenum-iron-tungsten, nickel-chromium-iron-molybdenum-copper-titanium, nickel-chromium-iron-molybdenum-titanium, nickel-iron-cobalt-aluminum-titanium-niobium, nickel-copper, nickel-copper-aluminum-titanium, nickel-molybdenum-chromium-iron, nickel-chromium-molybdenum-copper, nickel-chromium-molybdenum-iron-tungsten-copper, and nickel-chromium-molybdenum.

28. A thermal energy power system, comprising:
   a. a phase change medium;
   b. an inner manifold area;
   c. an outer manifold area;
   d. an intermediate manifold area;
   e. a first plurality of U-tubes coupled between the outer manifold area and the intermediate manifold area;
   f. a second plurality of U-tubes coupled between the intermediate manifold area and the inner manifold area, wherein the inner manifold area is fluidically coupled to the outer manifold area via the second plurality of U-tubes, the intermediate manifold area, and the second plurality of U-tubes;
   g. a brick structure configured to contain the phase change medium such that the inner manifold area, the intermediate manifold area, and the outer manifold area are substantially immersed in the phase change medium and wherein the bricks are configured to have a cooling zone which encourages the phase change medium to solidify in gaps defined by the bricks;
   h. a base which supports the brick structure;
   i. a pump;
   j. a renewable heat source;
   k. a turbine plant; and
   l. wherein the inner manifold area and the outer manifold area are reversibly connected in a closed loop with the pump, the renewable heat source, and the turbine plant and wherein the closed loop carries a heat transfer fluid.

29. The thermal energy power system of claim 28, wherein the renewable heat source is selected from the group consisting of a solar parabolic mirror, a solar minor farm, and a wind turbine.

30. The thermal energy power system of claim 28, wherein the heat transfer fluid comprises oil.

31. The thermal energy power system of claim 28, further comprising at least one liner layer.

32. The thermal energy power system of claim 31, wherein the at least one liner layer comprises a castable low-density refractory material.

33. The thermal energy power system of claim 31, wherein the at least one liner layer comprises a castable high-density refractory material.

34. The thermal energy power system of claim 31, wherein the at least one liner layer comprises:
   an outer liner comprising a castable low-density refractory material; and
   an inner liner comprising a castable high-density refractory material.

35. The thermal energy power system of claim 34, wherein the inner liner is thinner than the outer liner.

36. The thermal energy power system of claim 31, further comprising a filler layer between the bricks and the at least one liner layer.

37. The thermal energy power system of claim 36, wherein the filler layer is selected from the group consisting of sand and fiberglass.

38. A method of constructing a thermal energy storage system, comprising:
   forming a base;
   aligning at least one heat exchange system substantially over the base, the at least one heat exchange system comprising a substantially concentric manifold having an outer manifold area and an inner manifold area;
   dry-laying a brick wall substantially on the base to surround the at least one heat exchange system or an area where the at least one heat exchange system will be aligned; and
   filling the area defined by the base and the brick wall with a phase change medium such that the phase change medium substantially covers the at least one heat exchange system.

39. The method of claim 38, wherein forming the base further comprises forming the base on an insulator.

40. The method of claim 38, wherein the brick wall comprises a material selected from the group consisting of firebrick and refractory brick.

41. The method of claim 38, further comprising insulating the brick wall.

42. The method of claim 38, further comprising banding the brick wall.

43. The method of claim 38, further comprising:
   heating the phase change medium so that it transitions to a liquid phase and enters gaps defined by the dry-laid bricks of the brick wall; and
   allowing the phase change medium to cool enough to solidify in at least a portion of the gaps in order to substantially seal the brick wall where it meets the phase change medium.

44. A method of constructing a thermal energy storage system, comprising:
   forming a base;
   aligning at least one heat exchange system substantially over the base, the at least one heat exchange system comprising a substantially concentric manifold having an outer manifold area and an inner manifold area;
   dry-laying a brick wall substantially on the base to surround the at least one heat exchange system or an area where the at least one heat exchange system will be aligned;
   forming at least one liner layer inside the area occupied by the brick wall or inside the area the brick wall will occupy; and
   filling the area defined by the base and the at least one liner layer with a phase change medium such that the phase change medium substantially covers the at least one heat exchange system.

45. The method of claim 44, wherein forming the base further comprises forming the base on an insulator.

46. The method of claim 44, wherein the brick wall comprises a material selected from the group consisting of firebrick and refractory brick.

47. The method of claim 44, further comprising insulating the brick wall.

48. The method of claim 44, further comprising banding the brick wall.

49. The method of claim 44, further comprising filing an area between the at least one refractory liner and the brick wall with a filler layer.

50. The method of claim 49, wherein the filler layer is selected from the group consisting of sand and fiberglass.

51. The method of claim 44, wherein the at least one heat exchange system comprises a plurality of heat exchange systems coupled in series.

52. The method of claim 44, wherein the at least one heat exchange system comprises a plurality of heat exchange systems coupled in parallel.

53. A method of controlling a thermal energy storage system, comprising:
 a. when a renewable heat source is available:
  i. thermally and fluidically coupling the renewable heat source to an inner manifold area of a heat exchange system which is substantially immersed in a phase change medium and which is further coupled to an outer manifold area of the heat exchange system which is also substantially immersed in the phase change medium and which surrounds the inner manifold area; and
  ii. thermally and fluidically coupling the outer manifold area to a turbine plant and then back to the renewable heat source in a closed-loop heating mode which provides a remaining renewable energy source heat to the turbine plant; and
 b. when the renewable heat source is not available:
  i. thermally and fluidically coupling the renewable heat source to the outer manifold area; and
  ii. thermally and fluidically coupling the inner manifold area to the turbine plant and then back to the renewable heat source in a closed-loop cooling mode which provides a stored heat to the turbine plant.

54. A heat exchanger for a thermal energy storage system, comprising:
 an inner manifold area having at least one inner feed port;
 an outer manifold area surrounding the inner manifold area and having at least one outer feed port and fluidically coupled to the inner manifold area;
 at least one intermediate manifold area;
 a first plurality of U-tubes coupled between the outer manifold area and the at least one intermediate manifold area; and
 a second plurality of U-tubes coupled between the at least one intermediate manifold area and the inner manifold area;
 wherein the inner and outer manifold areas are configured to enable a heat transfer fluid to reversibly flow from the inner manifold area to the outer manifold area when the inner manifold area and the outer manifold area are substantially immersed in a phase change medium, and wherein the inner manifold area is fluidically coupled to the outer manifold area via the second plurality of U-tubes, the at least one intermediate manifold area, and the first plurality of U-tubes.

55. The heat exchanger of claim 54, wherein the inner manifold area is centered within the outer manifold area.

56. The heat exchanger of claim 54, wherein the inner manifold area and the outer manifold area lie on substantially the same plane.

57. The heat exchanger of claim 54, further comprising one or more core heat tubes coupled to the inner manifold area.

58. The heat exchanger of claim 54, wherein at least one of the second plurality of U-tubes comprises a bypass valve.

59. A thermal energy storage apparatus, comprising:
 a phase change medium; and
 a plurality of heat exchangers substantially immersed in the phase change medium, each of the heat exchangers comprising:
  an inner manifold area having at least one inner feed port;
  an outer manifold area surrounding the inner manifold area, and fluidically coupled to the inner manifold area, and having at least one outer feed port;
  at least one intermediate manifold area;
  a first plurality of U-tubes coupled between the outer manifold area and the at least one intermediate manifold area; and
  a second plurality of U-tubes coupled between the at least one intermediate manifold area and the inner manifold area;
 wherein the inner manifold area is fluidically coupled to the outer manifold area via the second plurality of U-tubes, the at least one intermediate manifold area, and the first plurality of U-tubes.

60. The thermal energy storage apparatus of claim 59, further comprising one or more core heat tubes coupled to the inner manifold areas of each heat exchanger.

61. The thermal energy storage apparatus of claim 59, wherein at least one of the U-tubes from the second plurality of U-tubes comprises a bypass valve configured to selectably create a hot spot in the phase change medium.

62. The thermal energy storage apparatus of claim 61, further comprising a tankless structure configured to contain the phase change medium.

63. The thermal energy storage apparatus of claim 62, wherein the tankless structure comprises bricks.

64. The thermal energy storage apparatus of claim 62, further comprising at least one layer of insulation substantially surrounding the bricks.

65. The thermal energy storage apparatus of claim 64, further comprising at least one band supporting the bricks.

66. The thermal energy storage apparatus of claim 62, wherein the bricks are configured to have a cooling zone which encourages the phase change medium to solidify in at least a portion of gaps defined by the bricks.

67. The thermal energy storage apparatus of claim 62, wherein the tankless structure further comprises at least one liner layer.

68. The thermal energy storage apparatus of claim 67, further comprising a filler layer between the bricks and the at least one liner layer.

69. The thermal energy storage apparatus of claim 59, wherein the plurality of heat exchangers are coupled in series, such that:
 one heat exchanger is an inner heat exchanger;
 another heat exchanger is an outer heat exchanger;
 the outer feed port for the inner heat exchanger is coupled to the inner feed port of the outer heat exchanger via any other intervening heat exchangers in the plurality of series heat exchangers.

70. The thermal energy storage apparatus of claim 59, wherein the plurality of heat exchangers are coupled in parallel, such that the inner feed ports of the plurality of heat exchangers are coupled together and the outer feed ports of the plurality of heat exchangers are coupled together.

* * * * *